US012184068B2

United States Patent
Jayan et al.

(10) Patent No.: US 12,184,068 B2
(45) Date of Patent: Dec. 31, 2024

(54) ENERGY DEMAND FORECASTING AND SUSTAINABLE ENERGY MANAGEMENT USING MACHINE LEARNING

(71) Applicant: Accenture Global Solutions Limited, Dublin (IE)

(72) Inventors: Jinu Jayan, Bangalore (IN); Pallavi S. Gawade, Thane-West (IN); Bhushan Gurmukhdas Jagyasi, Thane West (IN); Sandeep Narendra Vaity, Mumbai (IN); Pollachi Seetharam Sreedhar, Pollachi (IN); Rengaraj Ramasubbu, Chennai (IN); Saurabh Pashine, Indore (IN); Tamal Bhattacharyya, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 162 days.

(21) Appl. No.: 17/242,119

(22) Filed: Apr. 27, 2021

(65) Prior Publication Data

US 2022/0344934 A1 Oct. 27, 2022

(51) Int. Cl.
*H02J 3/00* (2006.01)
*G06N 20/00* (2019.01)
(Continued)

(52) U.S. Cl.
CPC .............. *H02J 3/003* (2020.01); *G06N 20/00* (2019.01); *G06Q 30/0206* (2013.01); *G06Q 50/06* (2013.01); *H02J 2300/20* (2020.01)

(58) Field of Classification Search
CPC ........ H02J 3/003; H02J 2300/20; H02J 3/004; H02J 3/381; H02J 3/466; G06N 20/00; G06Q 30/0206; G06Q 50/06
(Continued)

(56) References Cited

U.S. PATENT DOCUMENTS

2002/0194113 A1  12/2002  Lof et al.
2018/0285759 A1*  10/2018  Wood ..................... G06F 15/76
2020/0076196 A1   3/2020  Lee et al.

OTHER PUBLICATIONS

Government of India, Patent Office, Examination Report issued for Indian Patent Application No. 202244020945, dated Dec. 22, 2022, 9 pages.

\* cited by examiner

*Primary Examiner* — Mohammad Ali
*Assistant Examiner* — Saad M Kabir

(57) ABSTRACT

Aspects of the present disclosure provide systems, methods, and computer-readable storage media that leverage artificial intelligence and machine learning (ML) to forecast energy demand and to generate an energy plan for one or more facilities of an organization. For example, a system may forecast an occupancy of the facilities for use with historical demand data in forecasting the energy demand. The forecasting may be performed by one or more trained ML models. Additional ML models may be trained to select energy resources that satisfy the forecasted energy demand and that prioritize constraint(s). The system may generate an energy plan that indicates information related to the selected energy resources, such as cost, energy type, environmental impact, etc., for use in increasing an amount of renewable energy resources used at the facilities. In some implementations, the system may recommend actions to reduce a negative environmental impact associated with the selected energy resources.

18 Claims, 13 Drawing Sheets

(51) Int. Cl.
*G06Q 30/0201* (2023.01)
*G06Q 50/06* (2012.01)

(58) Field of Classification Search
USPC .......................................................... 700/291
See application file for complete search history.

| Facility | Incentive | Annual Demand Forecast | Reusable Energy Forecast | Renewable Energy Procurement Forecast | Conventional Energy Forecast Gap | Potential Emissions | Environmental Offset Recommendations ||||| Net Emissions | Total Cost |
|---|---|---|---|---|---|---|---|---|---|---|---|---|
| | | | | | | | Tree Plantations || REC Procurement ||||
| | | | | | | | # | Offset | Cost | # | Offset | Cost | | |
| BDC10 | Y | 7.6 | N/A | 6 | 1.6 | 1247 | 14994 | 1000 | $2.975 | 317 | 247 | $0.377 | 0 | $3.352 |
| MDC5 | N | 12.5 | N/A | 1.5 | 11 | 8573 | 105220 | 7014 | $20.825 | 2000 | 1559 | $2.380 | 0 | $23.205 |
| NODC7 | Y | 9.4 | 1.4 | 3 | 5 | 3897 | 43260 | 2129 | $5.062 | 2446 | 1911 | $2.917 | 1000 | $7.979 |
| WDC13 | N | 14.6 | 2.0 | 5.5 | 7.1 | 5534 | 66529 | 4472 | $10.501 | 1359 | 1062 | $1.621 | 0 | $12.122 |

FIG. 7

ENERGY DEMAND FORECASTING AND SUSTAINABLE ENERGY MANAGEMENT USING MACHINE LEARNING

TECHNICAL FIELD

The present disclosure relates generally to systems and methods for leveraging machine learning and artificial intelligence to forecast energy demand and generate an energy plan to improve use of sustainable energy resources.

BACKGROUND

Climate change is an issue that continues to draw global attention. As countries around the world work to reduce carbon emissions and other environmental impacts of modern living, various governing bodies and organizations are beginning to mandate that certain requirements be met by their members. One such example is the Paris Agreement, an international treaty that specifies that member countries are to take measures to limit global warming to below 2° Celsius (C) compared to pre-industrial levels, to prevent consequences such as heatwaves, extreme precipitation events, destruction of biodiversity, reduction of forest biomass, sea level rise, creation of ocean dead zones, and food shortages, among others. As countries take measures to reduce their environmental impact, many such countries are requiring businesses that operate within their borders to take similar measures, and to communicate such measures for tracking purposes. Thus, many organizations are implementing action plans for reducing carbon emissions and other negative environmental impacts resulting from their business operations.

One particular area in which organizations are focusing in their attempts to reduce carbon emissions is in controlling their use of non-renewable energy resources, such as coal, oil, natural gas, and the like. Not only are the energy resources limited in quantity, but removal of them from the earth typical has a negative environmental impact and burning these energy resources for power emits substantial amounts of carbon. Thus, sustainable (e.g., renewable) energy resources are crucial for organizations to reduce their carbon footprints and to grow their businesses in environmentally friendly ways. Organizations (and the facilities they operate) are faced with a variety of challenges in scheduling use of and purchase of energy resources, such as different rate slabs from electricity boards (e.g., which may limit peak load or other parameters of electricity usage), changing demand, different agreement and penalty clauses with energy providers or property managers, different energy requirements for various equipment and facilities, and the like. Many commercial and manufacturing facilities rely on a combination of multiple different energy resources to meet their energy demands, such as conventional energy from electricity boards (e.g., power companies or other utility managers that typically use non-renewable energy resources having negative environmental impact), renewable energy (e.g., solar power, wind power, hydroelectric power, and the like), and energy from diesel generators (often used as back-up energy sources to be used during outages). There is a need to increase the utilization of sustainable/renewable energy resources by organizations.

One common difficulty for organizations trying to increase their renewable energy resource use comes from unreliable energy demand forecasting. To illustrate, due to fluctuation of energy demand across different areas and power uses of a facility, such as elevators, lighting, heating and cooling, information technology (IT), cafeteria, auditorium, manufacturing bays, warehouses, it becomes difficult to accurately forecast energy demand. Although some systems have begun to forecast energy demand based on historical energy use, such technology fails to take into account the fluctuations in energy demand due to changes in occupancy of the facility, day and time, season, different operations, work schedules, business contracts, and the like. Accordingly, it is difficult to accurately forecast energy demand over various time periods. Because energy suppliers typically require estimation of energy consumption from a consumer in order to maintain grid stability, organizations often purchase an excess of energy resources to prevent outages due to fluctuating demand, which increases energy budgets. Additionally, to ensure that outages do not occur and interrupt business operations at a facility, an organization may purchase a larger proportion of back-up energy, which is typically diesel or another non-renewable energy resource. There is a need to more accurately forecast energy demand to enable an efficient and cost-effective transition to renewable energy.

SUMMARY

Aspects of the present disclosure provide systems, methods, apparatus, and computer-readable storage media that leverage artificial intelligence and machine learning to forecast energy demand and to generate an energy plan that incorporates the use of sustainable (e.g., renewable) energy resources. For example, a system described herein may be configured to forecast an occupancy at a facility of an organization and, based on the forecasted occupancy and other information such as historical energy demand, to forecast an energy demand for the facility that is more accurate than other energy forecasting systems. The system may implement trained machine learning (ML) models (e.g., neural networks, support vector machines, decision trees, random forests, or the like) to forecast the energy demand, such as on a facility-by-facility level, a region-by-region level, an operation-by-operation level, or an organization-by-organization level. The system may implement other trained ML models to select various energy resources to be acquired to satisfy the forecasted energy demand. These ML models may be trained to select particular energy resources that reduce or minimize cost while also increasing or maximizing use of a particular type of energy resource, such as renewable/sustainable energy resources (e.g., solar power, wind power, hydroelectric power, and the like). The selected energy resources may be represented, along with other information and/or recommended actions to reduce environmental impact, by an energy plan that is output by the system.

To illustrate in more detail, a server (or other energy forecasting and scheduling computing device) may be configured to forecast an occupancy of one or more facilities. The forecasted occupancy may be based at least in part on sensor data from one or more networked sensors or Internet of Things (IoT) devices located at the one or more facilities. The sensors may include one or more different types of sensors, such as identifier (ID) scanners (e.g., employee badge scanners, etc.), cameras, temperature sensors, or the like. In some implementations, the server may implement one or more ML models that are trained to forecast occupancy at the one or more facilities based on sensor data, processed image data, event schedule data, date and time information, and the like.

The server may provide the forecasted occupancy and historical energy demand data associated with the one or more facilities as input data to a first set of one or more ML models to forecast an energy demand for the one or more facilities. The first set of ML models may be trained based on correlated historical energy demand data and historical occupancy data associated with the one or more facilities. In some implementations, the first set of ML models may be trained based further on historical outage data associated with the one or more facilities to predict one or more outages or otherwise incorporate the one or more outages into the forecasted energy demand.

The server may provide the forecasted energy demand and available energy resources information as input data to a second set of one or more ML models to select energy resources to be used at the one or more facilities to satisfy the forecasted energy demand. The energy resources may be selected from available energy resources generated by the organization or available from one or more energy providers, such as an electric board, power company, wind farm, or the like. The selected energy resources may include renewable energy resources and non-renewable energy resources. The second set of ML models may be trained based on energy resource costs, available quantities of energy resources, target renewable energy resource use, target cost, target environmental impact offset, government incentives associated with energy resources, and the like, to select the energy resources that satisfy the forecasted energy demand in view of one or more criteria. In some implementations, the second set of ML models may be configured to prioritize or optimize the selection of energy resources with respect to cost, renewable energy resource use, environmental impact, or combination thereof.

After selecting the energy resources, the server may output an energy plan that is based on the selected energy resources. The energy plan may indicate a quantity and a cost of each selected energy resource to be acquired to satisfy the forecasted energy demand. The server may display the energy plan and/or automatically initiate action(s) to acquire the selected energy resources. In some implementations, the energy plan may indicate one or more recommended actions to offset an environmental impact associated with use of the selected energy resources. The recommended action(s) may include actions to be performed with respect the one or more facilities (or the organization), the environment, one or more government or regulatory agencies, or a combination thereof. For example, the recommended action(s) may include investing in proprietary renewable energy sources, reconfiguring assets at the one or more facilities to reduce an environmental impact (e.g., migrating certain computer functions from on-site equipment to cloud-based resources), planting trees, purchasing renewable energy certificates (RECs), or the like. In some implementations, the energy plan may indicate a cost-optimized schedule for energy resource purchasing and additional recommend actions that achieve a target environmental impact, such as carbon neutrality.

The present disclosure describes systems, methods, apparatus, and computer-readable media that provide benefits compared to conventional energy demand forecasting systems. For example, the systems described herein provide more accurate energy demand forecasting by leveraging sensor data, IoT device data, scheduling information, and the like to forecast an occupancy of a facility for use in forecasting the energy demand. Because the energy demand forecast takes into account a forecasted occupancy, the forecasted energy demand may be more accurate than an energy demand that is forecasted based only on historical energy use. As another example, the systems described herein may leverage artificial intelligence and machine learning to select amounts of various sustainable and non-sustainable energy resources to be used to meet the forecasted energy demand while also reducing or minimizing cost. Accordingly, an organization may begin converting to sustainable energy use in an efficient and cost-effective manner, thereby contributing to a reduction in negative environmental impact from operations, as well as gaining benefits of cheaper energy resources, receiving government incentives associated with using sustainable energy resources, and experiencing improved public perception for using sustainable energy resources. Additionally, the techniques described herein support automatic (or semi-automated) generation of an energy plan, and initiation of one or more actions that may cause an organization to achieve compliance with requirements of government or regulatory agencies.

In a particular aspect, a method for forecasting energy demand using machine learning includes determining, by one or more processors, a forecasted occupancy corresponding to one or more facilities of an organization based at least in part on sensor data received from one or more sensors located at the one or more facilities. The method also includes providing, by the one or more processors, first input data to a first set of one or more machine learning (ML) models to generate a forecasted energy demand corresponding to the one or more facilities. The first input data is based on the forecasted occupancy and historical energy demand data corresponding to the one or more facilities. The first set of ML models is configured to forecast energy demand based on energy data and occupancy data. The method includes providing, by the one or more processors, second input data to a second set of one or more ML models to select energy resources to be used at the one or more facilities to satisfy the forecasted energy demand. The second input data is based on the forecasted energy demand and available energy resources information. The second set of ML models is configured to select energy sources based on energy demand forecasts and energy source information. The method further includes outputting, by the one or more processors, an energy plan that is based on the selected energy resources.

In another particular aspect, a device for forecasting energy demand using machine learning includes a memory and one or more processors communicatively coupled to the memory. The one or more processors are configured to determine a forecasted occupancy corresponding to one or more facilities of an organization based at least in part on sensor data received from one or more sensors located at the one or more facilities. The one or more processors are also configured to provide first input data to a first set of one or more ML models to generate a forecasted energy demand corresponding to the one or more facilities. The first input data is based on the forecasted occupancy and historical energy demand data corresponding to the one or more facilities. The first set of ML models is configured to forecast energy demand based on energy data and occupancy data. The one or more processors are configured to provide second input data to a second set of one or more ML models to select energy resources to be used at the one or more facilities to satisfy the forecasted energy demand. The second input data is based on the forecasted energy demand and available energy resources information. The second set of ML models is configured to select energy sources based on energy demand forecasts and energy source information.

The one or more processors are further configured to output an energy plan that is based on the selected energy resources.

In another particular aspect, a non-transitory computer-readable storage medium stores instructions that, when executed by one or more processors, cause the one or more processors to perform operations for forecasting energy demand using machine learning. The operations include determining a forecasted occupancy corresponding to one or more facilities of an organization based at least in part on sensor data received from one or more sensors located at the one or more facilities. The operations also include providing first input data to a first set of one or more ML models to generate a forecasted energy demand corresponding to the one or more facilities. The first input data is based on the forecasted occupancy and historical energy demand data corresponding to the one or more facilities. The first set of ML models is configured to forecast energy demand based on energy data and occupancy data. The operations include providing second input data to a second set of one or more ML models to select energy resources to be used at the one or more facilities to satisfy the forecasted energy demand. The second input data is based on the forecasted energy demand and available energy resources information. The second set of ML models is configured to select energy sources based on energy demand forecasts and energy source information. The operations further include outputting an energy plan that is based on the selected energy resources.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIG. 7 shows an example energy plan according to one or more aspects;

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that leverage artificial intelligence and machine learning to forecast energy demand and to generate an energy plan that incorporates the use of sustainable (e.g., renewable) energy resources. The energy demand forecasting may be more accurate than other energy forecasting techniques, thereby enabling more cost-efficient purchasing of energy resources, some of which may include renewable or sustainable energy resources which may have more restrictions in purchasing and use based on energy suppliers, property manager rules, and the like. Systems described herein may implement or have access to machine learning (ML) model(s) that are trained to forecast energy demand based on forecasted occupancy and historical energy demand data. The occupancy may be forecast based on sensor data from sensors located at one or more facilities of an organization, such as identifier (ID) scanners, cameras, temperature sensors, and the like. In some implementations, the occupancy may be forecast by ML model(s) that are trained based on historical sensor data, scheduling information, and the like, to forecast occupancy of one or more facilities. Systems described herein may also implement or have access to ML model(s) that are trained to select energy resources to be used to satisfy forecasted energy demand. These ML model(s) may be trained to prioritize or optimize various constraints, such as cost, renewable energy resource use, or the like. Systems described herein may also generate energy plans that indicate the selected energy resources and optionally recommended actions for mitigating negative environmental impact. Thus, the present disclosure may provide an automated, intelligent system for improving accuracy of energy forecasting and for improving use of renewable/sustainable energy resources and otherwise mitigating or reducing negative environmental impact of energy use at facilities of an organization.

Figure 1:
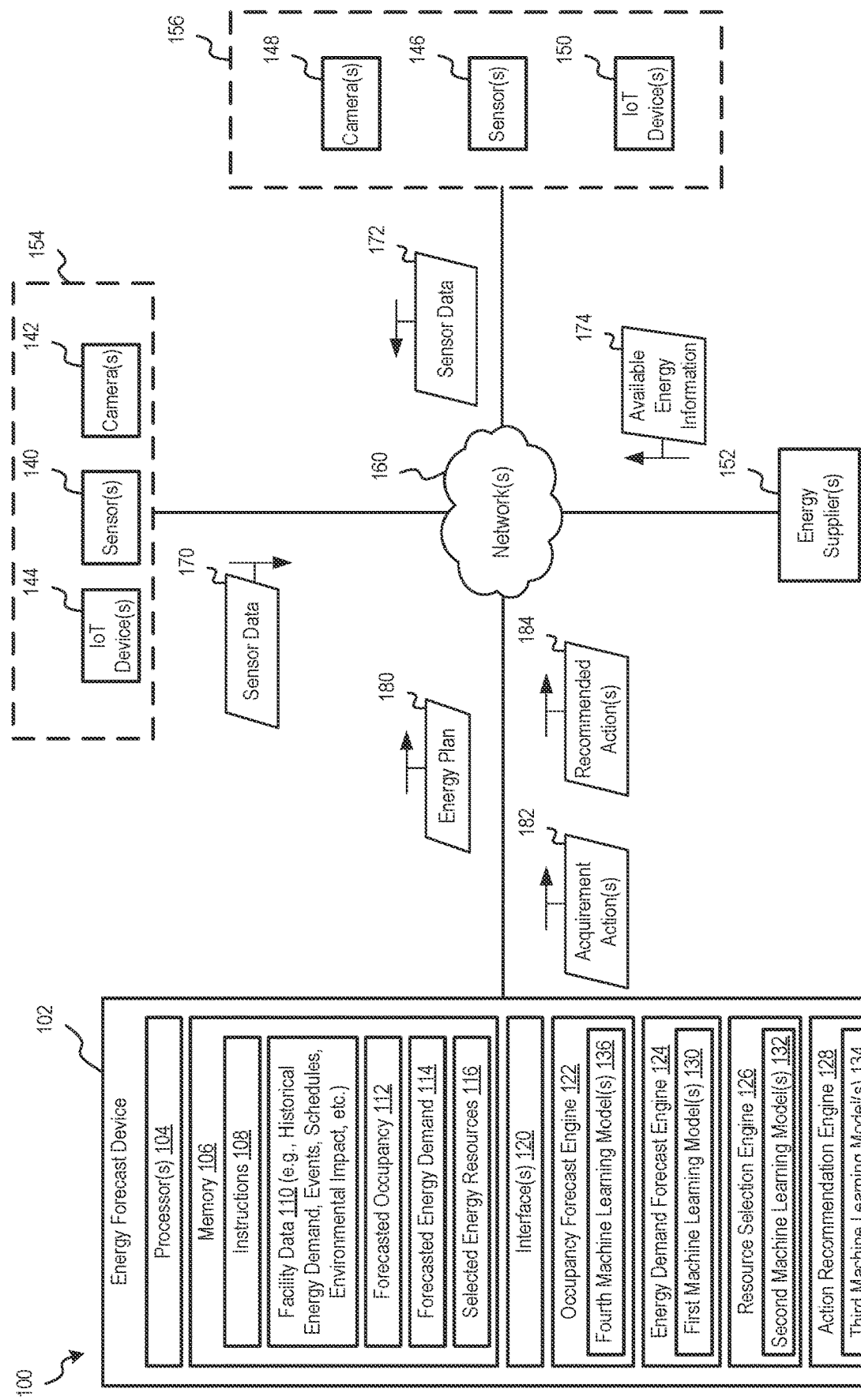
FIG. 1 is a block diagram of an example of a system that supports forecasting energy demand and generating an energy plan according to one or more aspects.

Referring to FIG. 1, an example of a system that supports forecasting energy demand and generating an energy plan according to one or more aspects is shown as a system 100. The system 100 may be configured to use artificial intelligence and machine learning to forecast energy demand and to generate an energy plan that indicates selected energy resources to be acquired to satisfy the forecasted energy demand. The energy plan may be generated for one or more facilities of an organization, such as a business or other entity. As shown in FIG. 1, the system 100 includes an energy forecast device 102, one or more sensors 140, one or more cameras 142, one or more Internet of Things (IoT) devices 144, one or more sensors 146, one or more cameras 148, one or more IoT devices 150, one or more energy suppliers 152, and one or more networks 160. In some implementations, one or more of the sensors 140, the cameras 142, the IoT devices 144, the sensors 146, the cameras 148, the IoT devices 150, and the energy suppliers 152 may be optional, or the system 100 may include additional components, such as additional sensors, additional cameras, additional IoT devices, one or more client or user devices, or the like, as non-limiting examples.

The energy forecast device 102 (e.g., a computing device) may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. The energy forecast device 102 includes one or more processors 104, a memory 106, one or more communication interfaces 120, an occupancy forecast engine 122, an energy demand forecast engine 124, a resource selection engine 126, and an action recommendation engine 128. In some other implementations, one or more of the components 122-128 may be optional, one or more additional components may be included in the energy forecast device 102, or both. It is noted that functionalities described with reference to the energy forecast device 102 are provided for purposes of illustration, rather than by way of limitation and that the exemplary functionalities described herein may be provided via other types of computing resource deployments. For example, in some implementations, computing resources and functionality described in connection with the energy forecast device 102 may be provided in a distributed system using multiple servers or other computing devices, or in a cloud-based system using computing resources and functionality provided by a cloud-based environment that is accessible over a network, such as the one of the one or more networks 160. To illustrate, one or more operations described herein with reference to the energy forecast device 102 may be performed by one or more servers or a cloud-based system that communicates with one or more client or user devices.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the energy forecast device 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the energy forecast device 102 may be stored in the memory 106 as instructions 108 that, when executed by the one or more processors 104, cause the one or more processors 104 to perform the operations described herein with respect to the energy forecast device 102, as described in more detail below. Additionally, the memory 106 may be configured to store data and information, such as facility data 110, a forecasted occupancy 112, a forecasted energy demand 114, and selected energy resources 116. Illustrative aspects of the facility data 110, the forecasted occupancy 112, the forecasted energy demand 114, and the selected energy resources 116 are described in more detail below.

The one or more communication interfaces 120 may be configured to communicatively couple the energy forecast device 102 to the one or more networks 160 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the energy forecast device 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the energy forecast device 102. In some implementations, the energy forecast device 102 is coupled to the display device, such as a monitor, a display (e.g., a liquid crystal display (LCD) or the like), a touch screen, a projector, a VR display, an AR display, an XR display, or the like. In some other implementations, the display device is included in or integrated in the energy forecast device 102.

The energy forecast device 102 may implement or have access to a variety of machine learning (ML) models. For example, the ML models may include a first set of one or more ML models 130, a second set of one or more ML models 132, a third set of one or more ML models 134, and a fourth set of one or more ML models 136. Each set of one or more ML models of the sets of ML models 130-136 may include a single ML model or multiple ML models that are trained or otherwise configured to perform particular operations, as further described below. In some implementations, the sets of ML models 130-136 may be implemented as one or more neural networks (NNs). In some other implementations, the sets of ML models 130-136 may be implemented as other types of ML models or constructs, such as support vector machines (SVMs), decision trees, random forests, regression models, Bayesian networks (BNs), dynamic Bayesian networks (DBNs), naive Bayes (NB) models, Gaussian processes, hidden Markov models (HMMs), regression models, and the like. Although shown in FIG. 1 as being included in the engines 122-128, the sets of ML models 130-136 may be stored in the memory 106 and executed by the respective engine (or the processor 104) to perform the functionality described herein. In some other implementations, one or more of the sets of ML models 130-136 may be stored and executed at an external device, such as a device in the cloud, and the energy forecast device 102 may provide input data to and receive output data from the external device to enable performance of the functionality described herein. Alternatively, the sets of ML models 130-136 may be trained at one or more external devices, and parameters indicative of the trained ML models may be provided to the energy forecast device 102 for executing the trained ML models at the energy forecast device 102. In some implementations in which some (or all) of the sets of ML models 130-136 are trained at the energy forecast device 102, multiple different versions of the respective sets of ML models may be trained and a grid search (or other techniques) may be used to select one or more hyperparameter values corresponding to the different versions such that a most successful set of ML models of each respective set may be selected from the multiple trained ML models, as further described below with reference to FIGS. 6 and 11.

The occupancy forecast engine 122 is configured to forecast an occupancy of one or more facilities of the organization. The occupancy may be forecast based on data from devices located at the one or more facilities, such as the sensors 140, the cameras 142, the IoT devices 144, the sensors 146, the cameras 148, the IoT devices 150, or a combination thereof. This information may be used to generate historical occupancy data for the one or more facilities, as well as to identify trends in occupancy, as further described herein. The occupancy forecast engine 122 may be configured to forecast the occupancy based on the historical occupancy data (e.g., based on sensor or other output data from the components at the one or more facilities) as well as scheduling data (e.g., indicating work shifts, events, planned guests, interviews, and the like), seasonal data, time/date information, and the like, as further described below. In some implementations, the occupancy forecast engine 122 may include or access the fourth set of ML models 136 to forecast the occupancy. For example, the fourth set of ML models 136 may be trained based on historical occupancy data, historical sensor data, historical seasonal data, and historical scheduling data to forecast occupancy of the one or more facilities based on input sensor data, input scheduling data, and input seasonal data. Additional details of forecasting occupancy using ML models are described below with reference to FIG. 4.

The energy demand forecast engine 124 is configured to forecast an energy demand that corresponds to the one or more facilities. The energy demand forecast engine 124 may forecast the energy demand for the one or more facilities based on forecasted occupancy for the one or more facilities (e.g., the forecasted energy demand may be proportional to the forecasted occupancy), historical energy demand data, historical outage data, historical occupancy data, and the like. In some implementations, the energy demand forecast engine 124 may include or access the first set of ML models 130 to forecast the energy demand. For example, the first set of ML models 130 may be trained based on historical energy demand data, historical outage data, and historical occupancy data to forecast energy demand for the one or more facilities based on input occupancy, input seasonal data, and input time/date information. Additional details of forecasting energy demand using ML models are described below with reference to FIGS. 2-3.

The resource selection engine 126 is configured to select one or more energy resources to be acquired to satisfy a forecasted energy demand corresponding to the one or more facilities. For example, the resource selection engine 126 may select one or more energy resources that are provided by the energy suppliers 152 to be acquired (e.g., purchased) to satisfy the forecasted energy demand corresponding to the one or more facilities. The selected energy resources may include renewable and non-renewable energy resources in sufficient quantities to satisfy the forecasted energy demand and, optionally, to satisfy one or more constraints such as cost, renewable energy resource use, or the like. In some implementations, the resource selection engine 126 may include or access the second set of ML models 132 to select the energy resources. For example, the second set of ML models 132 may be trained based on energy resource information such as cost, available quantities, type (e.g., renewable/sustainable or non-renewable/non-sustainable), target costs, target ratios of different types of energy resources, or the like, to select energy resources from available energy resources to satisfy forecasted energy demands. Additional details of selecting energy resources using ML models are described below with reference to FIG. 5.

The action recommendation engine 128 is configured to output one or more recommended actions for reducing or compensating for a negative environmental impact corresponding to use of energy resources selected by the resource selection engine 126. For example, the action recommendation engine 128 may select one or more recommended actions from multiple preset actions that reduce negative environmental impacts. The recommendations actions may include actions with respect to the organization or the one or more facilities (e.g., investing in renewable energy resource generation, replacing equipment with newer, more energy-efficient models, and the like), actions with respect to the environment (e.g., planting trees), actions with respect to government or regulatory agencies (e.g., purchasing renewable energy certificates (RECs)), other actions, or a combination thereof. In some implementations, the action recommendation engine 128 may include or access the third set of ML models 134 to output the recommended actions. For example, the third set of ML models 134 may be trained based on environmental impact data, costs of the multiple preset actions, target costs, target environmental impacts, and the like, to recommend one or more actions based on input energy resources. Additional details of recommending actions using ML models are described below with reference to FIG. 8.

The energy forecast device 102 is configured to communicate with components of the system 100 that are located at the one or more facilities. For example, the sensors 140, the cameras 142, and the IoT devices 144 are located at a first facility 154 and the sensors 146, the cameras 148, and the IoT devices 150 are located at a second facility 156. The facilities 154-156 are managed by the organization and may be the same or different types of facilities dedicated to performing one or more activities to achieve the organization's goals. For example, the facilities 154-156 may include or correspond to manufacturing plants, offices, business campuses, shipping centers, warehouses, laboratories, equipment storage facilities, parking garages, airfields, docks, or the like. The facilities 154-156 may be located in the same or different geographic regions. For example, the facilities 154-156 may be located at a single property or in different cities, states, counties, countries, or continents. Although two facilities are shown in FIG. 1, in other examples, fewer than two or more than two facilities may include components of the system 100.

The sensors 140 may include various types of sensors that are configured to measure parameters associated with the first facility 154. For example, the sensors 140 may include identifier (ID) sensors (e.g., ID scanners, badge readers, or the like), temperature sensors, pressure sensors, light sensors, sound sensors, proximity sensors, and the like. The cameras 142 may include one or more cameras or image capture devices that are located at the first facility 154. For example, the cameras 142 may include security cameras, web cameras or other telecommunication devices, facial recognition cameras, or the like. The IoT devices 144 may include one or more IoT devices such as sensors or other measuring devices that monitor aspects of or support distributed operations at the first facility 154. For example, the IoT devices 144 may include remote sensors, measuring devices, smart devices, hubs, smart controllers, and the like. The sensors 146, the cameras 148, and the IoT devices 150 may include similar devices to the sensors 140, the cameras 142, and the IoT devices 144, respectively, that are located at the second facility 156.

The energy suppliers 152 may include one or more suppliers of energy resources that may be acquired (e.g., purchased, leased, etc.) and used by the organization to satisfy energy demands at the facilities 154-156. For example, the energy suppliers 152 may include electricity boards, power companies, diesel engine suppliers, wind farm operators, solar panel operators, or the like. The energy suppliers 152 may provide a single type of energy resource or multiple types of energy resources (or electricity generated using a single type of energy resource or multiple types of energy resources). The types of energy resources may include non-renewable/non-sustainable energy resources such as oil, coal, natural gas, and the like, renewable/sustainable energy resources such as wind power, solar power, hydroelectric power, and the like, or a combination thereof.

During operation of the system 100, the energy forecast device 102 may receive input data from the first facility 154 and the second facility 156. For example, the sensors 140, the cameras 142, the IoT devices 144, or a combination thereof, at the first facility 154 may generate and provide sensor data 170 to the energy forecast device 102, such as transmitting the sensor data 170 via the networks 160. Similarly, the sensors 146, the cameras 148, the IoT devices 150, or a combination thereof, at the second facility 156 may generate and provide sensor data 172 to the energy forecast device 102, such as transmitting the sensor data 172 via the networks 160. Although referred to as "sensor data," the sensor data 170-172 may include measurements generated by sensors, image data generated by cameras, and other data generated by other devices that are located at the facilities 154-156. The sensor data 170-172 may be generated during performance of various monitoring operations by the sensors 140, the cameras 142, the IoT devices 144, the sensors 146, the cameras 148, and the IoT devices 150, such as scanning ID badges, monitoring areas of the facilities 154-156 for recording security footage, measuring temperatures, and the like. The sensor data 170-172 may be generated during normal operation of the sensors 140, the cameras 142, the IoT devices 144, the sensors 146, the cameras 148, and the IoT devices 150, and the sensor data 170-172 may be provided to the energy forecast device 102 for use in forecasting occupancy at the facilities 154-156. In some implementations, the energy forecast device 102 may generate additional sensor data, additional historical energy demand data, or both, based on the sensor data 170-172 such as by using gradient descent, as further described herein.

The energy forecast device 102 (e.g., the occupancy forecast engine 122) may use the sensor data 170-172 and optionally other data to forecast occupancy at the facilities 154-156 (e.g., to generate the forecasted occupancy 112). For example, the occupancy forecast engine 122 may process image data from the cameras 142 and 148 to determine a number of people represented by the image data. As another example, the sensor data 170-172 may include data from ID scanners (e.g., the sensors 140 and 146) that indicate a number of employee IDs scanned at entrance(s) to the facilities 154-156, which may be used by the occupancy forecast engine 122 to estimate a number of employees on-site at the facilities 154-156. As another example, the occupancy forecast engine 122 may compare temperature values to thresholds to estimate a number of people on-site at the facilities 154-156 based on the temperature, as a higher temperature may be indicative of more people being on-site (and thus more body heat being detected). Similar comparisons may be made based on pressure data or other sensor measurements, and/or output from the IoT devices 144 and 150. The forecasted occupancy 112 indicates a number of people (e.g., employees, visitors, and others) that are predicted to be on-site at the facilities 154-156 during one or more particular time periods.

In some implementations, the occupancy forecast engine 122 may generate the forecasted occupancy 112 based further on other data, such as event data corresponding to the facilities 154-156, scheduling data corresponding to the facilities 154-156, seasonal data corresponding to the facilities 154-156, and the like. The facility data 110 may include or indicate schedules (e.g., work shifts, vacation schedules, etc.) corresponding to the facilities 154-156, event data (e.g., events scheduled to occur, such as social events, conferences, interviews, etc.) corresponding to the facilities 154-156, seasonal data (e.g., shift changes based on seasons, reduced scheduled manufacturing output during less profitable seasons, etc.) corresponding to the facilities 154-156, environmental impact data corresponding to use of energy resources at the facilities 154-156 (to be used in other operations described below), and the like. The occupancy forecast engine 122 may generate the forecasted occupancy 112 based on the sensor data 170-172 and some (or all) of the facility data 110. For example, the occupancy forecast engine 122 may increase an initial occupancy forecast based on the sensor data 170-172 if event data included in the facility data 110 indicates a conference or other event is scheduled to occur at the facilities 154-156. As other examples, an initial occupancy may be increased based on scheduling data included in the facility data 110 that indicates multiple interviews are to occur at the facilities 154-156 or decreased based on seasonal data included in the facility data 110 indicating that employee shifts are reduced to smaller staff during winter.

In some implementations, the occupancy forecast engine 122 may provide the sensor data 170-172 and optionally at least some of the facility data 110 (e.g., scheduling data, event data, seasonal data, etc.) as input data to the fourth set of ML models 136 to generate the forecasted occupancy 112. The fourth set of ML models 136 may be trained to forecast an occupancy of the facilities 154-156 based on input data including sensor data, scheduling data, event data, seasonal data, and the like. In this manner, the occupancy forecast engine 122 may forecast occupancy values that adapt to changes in sensor data, schedules, time, and the like, in an efficient manner using artificial intelligence (AI) and ML, as compared to requiring programming of algorithms derived from static data.

After the forecasted occupancy 112 is determined, the energy demand forecast engine 124 may forecast energy demand for the facilities 154-156 during one or more time periods to generate the forecasted energy demand 114. The forecasted energy demand 114 may be generated based on the forecasted occupancy 112, historic energy demand corresponding to the facilities 154-156, scheduling data corresponding to the facilities 154-156, date/time information, seasonal data corresponding to the facilities 154-156, other information, or a combination thereof. For example, the energy demand forecast engine 124 may generate an initial forecasted energy demand based on the forecasted occupancy 112 and historical energy demand data, and the initial forecasted energy demand may be increased based on scheduling data included in the facility data 110 indicating that particular manufacturing equipment is scheduled to run during the time period(s). As another example, the energy demand forecast engine 124 may decrease the initial forecasted energy demand based on seasonal data included in the facility data 110 indicating that energy use decreases during spring (e.g., that energy use increases during winter due to heating the facilities 154-156). The forecasted energy demand 114 may include a total quantity of electricity predicted to be used during the one or more time periods, optionally divided by facility, by equipment, by region, or the like. In some implementations, the forecasted energy demand 114 may include total energy demand for the time period(s), or the forecasted energy demand 114 may include normal energy demand and backup energy demand. Additionally or alternatively, the forecasted energy demand 114 may indicate one or more forecasted outages during the time period(s). In some implementations, the energy demand forecast engine 124 may provide the forecasted occupancy 112 and some (or all) of the facility data 110 (e.g., scheduling data, event data, seasonal data, etc.) as input data to the first set of ML models 130 to generate the forecasted energy demand 114. The first set of ML models 130 may be trained to forecast energy demand for the facilities 154-156 based on input data including forecasted occupancy data, scheduling data, event data, seasonal data, and the like.

After the forecasted energy demand 114 is determined, the resource selection engine 126 may select one or more energy resources (the selected energy resources 116) to be acquired to satisfy the forecasted energy demand 114. The selected energy resources 116 include energy resources offered by the energy suppliers 152. For example, the energy forecast device 102 may receive available energy information 174 from the energy suppliers 152, and the available energy information 174 may indicate multiple available energy resources and available quantities of the energy resources, costs associated with the energy resources, government incentives associated with particular energy resources, environmental impact associated with the energy resources, one or more energy resource thresholds, or a combination thereof. The resource selection engine 126 may determine the selected energy resources 116 (e.g., may select one or more of the available energy resources) based on the available energy information 174 (e.g., costs, available quantities, etc.), government incentive information corresponding to the available energy resources, government or regulatory requirements for different types of energy resources included in the available energy resources, environmental impact data corresponding to the available energy resources, and the like, in order to satisfy the forecasted energy demand 114. For example, the resource selection engine 126 may select the selected energy resources 116 such that a total amount of power generated by using the selected energy resources 116 satisfies the forecasted energy demand 114.

In some implementations, the resource selection engine 126 may select energy resources to prioritize, or optimize, one or more constraints, such as a total cost, a total quantity or percentage of renewable/sustainable energy resource use, satisfaction of regulatory requirements, or the like. As a non-limiting example, the resource selection engine 126 may select energy resources that include at least 20% renewable/sustainable energy resources and have a total cost that does not exceed a cost threshold. In some implementations, the resource selection engine 126 may provide the forecasted energy demand 114, some (or all) of the facility data 110 (e.g., environmental impact corresponding to energy use at the facilities 154-156), and the available energy information 174 as input to the second set of ML models 132 to determine the selected energy resources 116. The second set of ML models 132 may be trained to select one or more of multiple preset energy resources based on input data including forecasted energy demand, energy costs, availability data, environmental impact data, incentive or regulatory information, constraints, and the like.

In some implementations, after the selected energy resources 116 are selected, the action recommendation engine 128 determines one or more recommended actions 184 to reduce or offset the environmental impact that corresponds to the selected energy resources 116. For example, the environmental impact may include carbon emissions (e.g., carbon dioxide ($CO_2$) released into the atmosphere from fossil fuel or other energy resource combustions), other types of emissions (e.g., greenhouse gases), water pollution (e.g., results from fossil fuel combustion entering streams, rivers, lakes, oceans, etc.), physical changes to the landscape (e.g., due to strip mining, "fracking", and the like), other environmental impacts, or a combination thereof, and the recommended actions 184 may include different types of actions, such as actions with respect to the organization and the facilities 154-156, actions with respect to the environment, actions with respect to government or regulatory agencies, and the like. As non-limiting examples, actions with respect to the organization and the facilities 154-156 may include integrating renewable/sustainable energy supply devices (e.g., solar panels, wind turbines, etc.) at the facilities 154-156, modifying or adding additional equipment to industrial equipment at the facilities 154-156 (e.g., adding $CO_2$ scrubbers), modifying or improving technology or operations such as migrating on-site databases and computer resources to cloud-based systems, or the like. As non-limiting examples, actions with respect to the environment may include planting trees, planting other plants, organizing stream or river cleanups, removing litter or other solid waste, or the like. As non-limiting examples, actions with respect to government or regulatory agencies may include purchasing renewable energy credits (RECs), investing in environmental improvement organizations, or the like.

To illustrate recommending actions to offset the environmental impact corresponding to the selected energy resources 116, the action recommendation engine 128 may select, from multiple preset actions, one or more actions to be recommended to offset the environmental impact corresponding to the selected energy resources 116, such as planting a particular quantity of trees and purchasing a particular number of RECs based on selecting a first percentage of non-renewable/non-sustainable energy resources and a second percentage of renewable/sustainable energy resources to be included in the selected energy resources 116. Each of the available actions may be associated with a respective positive environmental impact, a respective cost, and the like, and such information may be used by the action recommendation engine 128 in addition to the selected energy resources 116 to select the recommended actions 184. The action recommendation engine 128 may select the recommended actions 184 to satisfy a particular criterion (e.g., environmental impact threshold) or to prioritize or optimize a particular criterion (e.g., total cost, environmental impact, etc.). For example, the action recommendation engine 128 may determine a net environmental impact estimate based on the respective environmental impacts that correspond to each of the selected energy resources 116, and the action recommendation engine 128 may compare the net environmental impact estimate to one or more thresholds. Depending on the relationship between the net environmental impact estimate and the one or more thresholds, the action recommendation engine 128 may select one or more of the available actions as the recommended actions 184. For example, if the net environmental impact estimate satisfies a first threshold, the recommended actions 184 may include purchasing RECs, and if the net environmental impact estimate satisfies a second threshold that is greater than the first threshold, the recommended actions 184 may include purchasing additional RECs and planting a particular quantity of trees. In some implementations, the action recommendation engine 128 may provide the selected energy resources 116 and, optionally, one or more constraints, as input data to the third set of ML models 134 to determine the recommended actions 184. The third set of ML models 134 may be trained to select one or more of the preset actions based on input data including selected energy resources, constraints, and the like.

After the selected energy resources 116 (and optionally the recommended actions 184) are selected, the energy forecast device 102 (e.g., the processor 104) may generate an energy plan 180 based on the selected energy resources 116. The energy plan 180 may indicate the selected energy resources 116, the forecasted energy demand 114, costs corresponding to the selected energy resources 116, environmental impact information corresponding to the selected energy resources 116, any government or regulatory agency requirements, other information, or a combination thereof. An illustrative energy plan is described further herein with reference to FIG. 7. The energy plan 180 may indicate information in various groupings or granularities, such as indicating selected energy resources for each of the facilities 154-156, for each geographic region of one or more geographic regions (e.g., city, county, state, country, continent, etc.) in which the organization operates, or for each operational group (e.g., business, manufacturing, sales, etc.) of the organization. In some implementations in which environmental impact actions are recommended, the energy plan 180 may include the recommended actions 184, environmental impact information corresponding to the recommended actions 184, costs corresponding to the recommended actions 184, total cost(s), net environmental impact(s), and the like. In some implementations, the energy forecast device 102 may output the energy plan 180 to a device coupled to the networks 160, such as a user or client device. Alternatively, the energy forecast device 102 may output the energy plan 180 to a display device coupled to or integrated within the energy forecast device 102. Additionally or alternatively, the energy plan 180 may be stored at the memory 106 or at an external location such as a database.

In some implementations, the energy forecast device 102 may initiate one or more operations based on the energy plan 180. For example, the energy forecast device 102 may initiate one or more acquirement actions 182 to acquire (e.g., purchase, lease, etc.) at least some of the selected energy resources 116 from the energy suppliers 152. As non-limiting examples, the acquirement actions 182 may include providing selection data to the energy suppliers 152 to select the selected energy resources 116 from the available energy resources offered by the energy suppliers 152, scheduling a meeting on an electronic calendar of the energy suppliers 152 for a member of the organization to communicate with a representative of the energy suppliers 152, automatically accepting term(s), condition(s), or contract(s) associated with acquiring the selected energy resources 116, providing payment information to the energy suppliers 152, other actions, or a combination thereof. Additionally or alternatively, the energy forecast device 102 may initiate or perform at least one of the recommended actions 184 at the first facility 154 or the second facility 156. For example, the energy forecast device 102 may schedule construction of a renewable/sustainable energy source at the first facility 154, request prices and other information from one or more cloud computing providers for transitioning computing resources from the second facility 156 to cloud-based systems, initiate a periodic review of equipment at the first facility 154 for replacing outdated equipment or equipment that satisfies an environmental impact threshold, or the like. Alternatively, the energy forecast device 102 may output the energy plan 180 that indicates some of the recommended actions 184 via a graphic user interface (GUI) to enable performance of one or more manual activities by workers, employees, volunteers, or others, such as planting trees, purchasing RECs, implementing modifications to equipment and systems at the facilities 154-156, and the like. The recommended actions 184 may include automatic actions, manual actions, or both, such as planting trees, reconfiguring one or more systems at the facilities 154-156, ceasing operation of particular equipment at the facilities 154-156, obtaining one or more RECs, other actions, or a combination thereof.

As described above, the system 100 supports forecasting energy demand and generating energy plans that enable increase in the use of renewable/sustainable energy resources and/or a reduced environmental impact corresponding to energy resource use. The system 100 may provide benefits compared to conventional energy demand forecasting systems. For example, the system 100 may forecast a more accurate energy demand (e.g., the forecasted energy demand 114) by leveraging the sensor data 170-172 (e.g., data from sensors, cameras, IoT device data, etc., located at the facilities 154-156) and at least some of the facility data 110 (e.g., scheduling data, event data, seasonal data, day/time information, and the like) to forecast an occupancy of the facilities 154-156 (e.g., the forecasted occupancy 112) for use in generating the forecasted energy demand 114. Because the forecasted energy demand 114 is based on the forecasted occupancy 112 as well as historical energy demand data (and some or all of the facility data 110), the forecasted energy demand 114 may be more accurate than an energy demand that is forecasted based only on historical energy data. As another example, the system 100 may leverage artificial intelligence and machine learning to select amounts of various sustainable and non-sustainable energy resources as the selected energy resources 116 while also reducing or minimizing cost of the selected energy resources 116. Accordingly, an organization that operates or is served by the system 100 may begin converting to or increasing sustainable energy resource use in an efficient and cost-effective manner, thereby contributing to a reduction in negative environmental impact from operations, as well as gaining benefits of cheaper energy resources, receiving government incentives associated with using sustainable energy resources, and experiencing improved public perception for using sustainable energy resources. Additionally, the system 100 supports automatic (or semi-automated) generation of the energy plan 180 and initiation of the recommended actions 184 that may cause the organization to achieve compliance with requirements of government or regulatory agencies with reduced or no user input.

Figure 2:
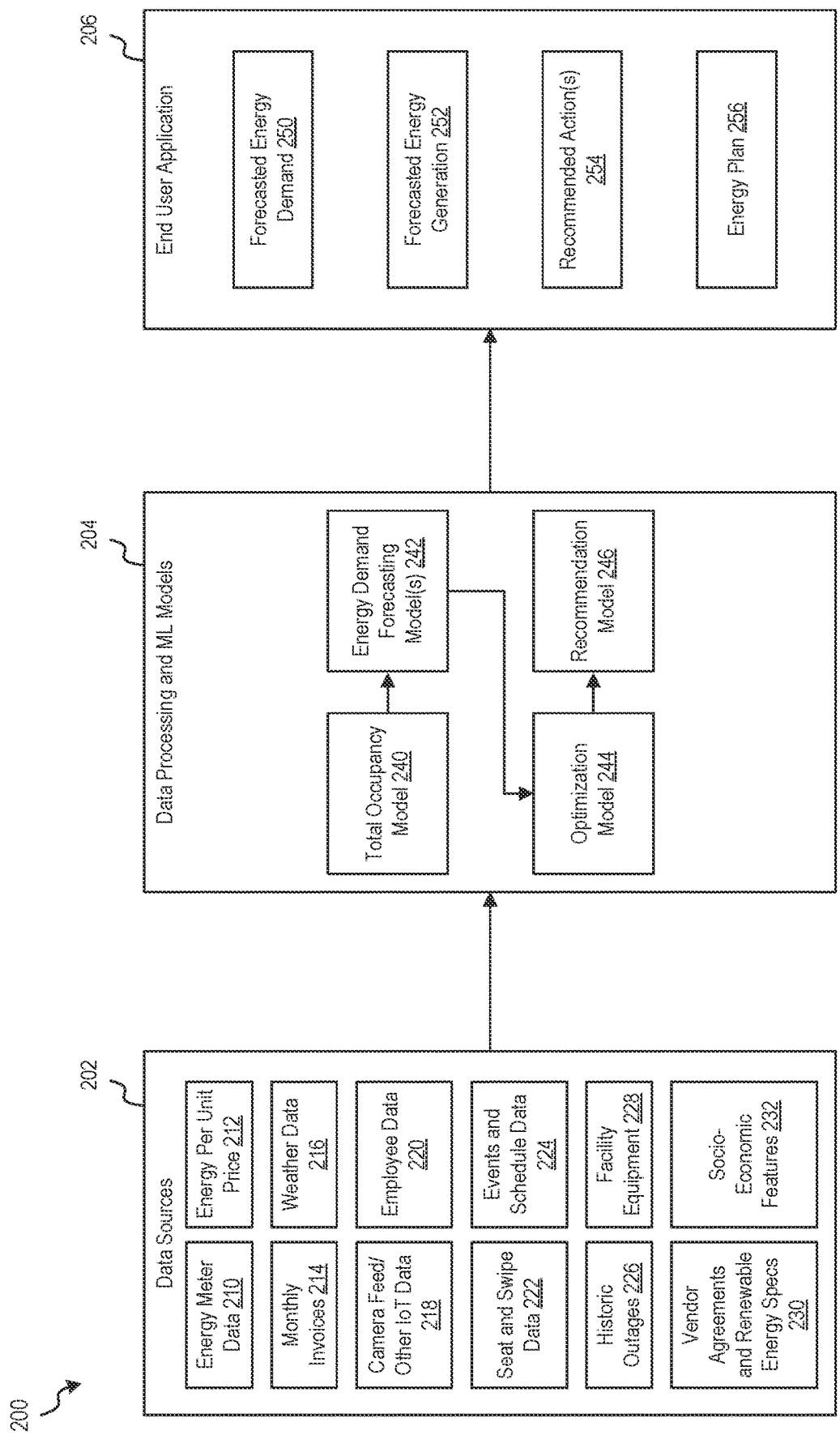
FIG. 2 is a block diagram of an example of a system that supports forecasting energy demand and generating an energy plan for an organization that purchases energy resources according to one or more aspects.

Referring to FIG. 2, an example of a system that supports forecasting energy demand and generating an energy plan for an organization that purchases energy resources according to one or more aspects is shown as a system 200. In some implementations, the system 200 (or components thereof) may be included in or correspond to the system 100 (or components thereof). As shown in FIG. 2, the system 200 includes data sources 202, data processing and ML models 204, and an end user application 206.

The data sources 202 may include one or more data sources for which data to be used as training data, input data, or a combination thereof, for the data processing and ML models 204 may be extracted. In the example shown in FIG. 2, the data sources 202 include energy meter data 210, energy per unit price 212, monthly invoices 214, weather data 216, camera feed/other IoT data 218, employee data 220, seat and swipe data 222, events and schedule data 224, historic outages 226, facility equipment data 228, vendor agreements and renewable energy specifications 230, and socio-economic features 232. In other implementations, the data sources 202 may include more or fewer data sources. The data sources 202 may include data received from devices located at one or more facilities of an organization, such as the sensor data 170-172 of FIG. 1, data corresponding to the one or more facilities, such as the facility data 110 of FIG. 1, data from energy suppliers, such the available energy information 174, data from other sources, or a combination thereof.

The energy meter data 210 may include measurements of energy use from energy meters (e.g., the sensors 140 and 146 of FIG. 1) located at the one or more facilities. The energy per unit price 212 may include price per units of energy, such as electricity, used at the one or more facilities. The energy per unit price 212 may vary based on the energy supplier, the type of energy (e.g., renewable/sustainable or non-renewable/non-sustainable, or types of renewable/sustainable energy and types of non-renewable/non-sustainable energy), the time of year, or the like. The monthly invoices 214 may include invoices for energy resources used at the one or more facilities, on a monthly or other periodic (daily, weekly, yearly, etc.) basis. The weather data 216 may indicate historic or predicted weather conditions, temperatures, humidity, barometric pressure, or the like, affecting the one or more facilities. The camera feed/other IoT data 218 may include image data from cameras (e.g., the cameras 142 and 148 of FIG. 1), measurement data from IoT devices (e.g., the IoT devices 144 and 150 of FIG. 1), or a combination thereof. The employee data 220 may include employee files, employee shift schedules, names, job positions, working locations, and the like. The seat and swipe data 222 may include data from ID scanners (e.g., the sensors 140 and 146 of FIG. 1) such as ID badge readers (e.g., swipe data), employee timers or presence detectors (e.g., seat data), and the like. The events and schedule data 224 may include information indicating scheduled events at the one or more facilities, such as conferences, social events, media events, and the like, work or shift schedules, scheduled interviews, scheduled guests, manufacturing schedules, and the like. The historic outages 226 may include information indicating the date, time, and duration of power outages recorded at the one or more facilities. The facility equipment data 228 may include information indicating types and quantities of equipment at the one or more facilities that require energy, average energy requirements of the equipment, or other information related to the equipment. The facility equipment data 228 may also include building parameters that correspond to buildings located at the one or more facilities, such as numbers of rooms, numbers of floors, average or maximum occupancies, insulation information, on-site energy resources, or the like. The vendor agreements and renewable energy specifications 230 may indicate agreements with energy suppliers (e.g., the energy suppliers 152 of FIG. 1), quantity and prices of energy resources included in the agreements, information associated with renewable energy resources (e.g., prices, available quantities, environmental impact, etc.), government or regulatory requirements for renewable energy resources, government incentives corresponding to renewable energy resources, or the like. The socio-economic features 232 may include information indicating socio-economic benefits that correspond to renewable resources, such as decreased costs, government incentives, employee happiness, public perception, business relationships, and the like.

The data processing and ML models 204 may receive data from the data sources 202 and may use the data as training data and/or input data to one or more models used to generate output to be provided to the end user application. In the example shown in FIG. 2, the data processing and ML models may include a total occupancy model 240, energy demand forecasting models 242, an optimization model 244, and a recommendation model 246. Each of the models 240-246 may include one or more ML models, such as NNs, SVMs, decision trees, random forests, other ML types, or the like, that are trained to perform various forecasting, resource selection, and recommendation selection tasks.

The total occupancy model 240 may include one or more ML models configured to forecast an occupancy of one or more facilities. In some implementations, the total occupancy model 240 may include or correspond to the fourth set of ML models 136 of FIG. 1. The total occupancy model 240 may be trained based on data from the data sources 202, such as the camera feed/other IoT data 218, the employee data 220, the seat and swipe data 222, and the events and schedule data 224, as non-limiting examples, and the total occupancy model 240 may receive input data from the data sources 202, such as the camera feed/other IoT data 218, the employee data 220, the seat and swipe data 222, and the events and schedule data 224, as non-limiting examples. The total occupancy model 240 may output a forecasted total occupancy for the one or more facilities based on the input data, and the forecasted total occupancy may be provided as input data to the energy demand forecasting models 242. Additional details of forecasting occupancy are described herein with reference to FIG. 4.

The energy demand forecasting models 242 may include one or more ML models configured to forecast an energy demand that corresponds to the one or more facilities. In some implementations, the energy demand forecasting models 242 may include or correspond to the first set of ML models 130 of FIG. 1. The energy demand forecasting models 242 may be trained based on data from the data sources 202, such as the energy meter data 210, the weather data 216, the historic outages 226, and the facility equipment data 228, as non-limiting examples, and the energy demand forecasting models 242 may receive input data including the forecasted total occupancy from the total occupancy model 240 and input from the data sources 202, such as the weather data 216 and the events and schedule data 224, as non-limiting examples. The energy demand forecasting models 242 may output a forecasted energy demand for the one or more facilities based on the input data, and the forecasted energy demand may be provided as input data to the optimization model 244. Additional details of forecasting energy demand are described above with reference to FIG. 1.

The optimization model 244 may include one or more ML models configured to select energy resources that satisfy a forecasted energy demand and that prioritize, or optimize, one or more constraints. In some implementations, the optimization model 244 may include or correspond to the second set of ML models 132 of FIG. 1. The optimization models 244 may be trained based on data from the data sources 202, such as the energy per unit price 212, the monthly invoices 214, the historic outages 226, and the facility equipment data 228, as non-limiting examples, and the optimization model 244 may receive input data including the forecasted energy demand from the energy demand forecasting models 242, one or more constraints to be prioritized (or optimized), and input from the data sources 202, such as the vendor agreements and renewable energy specifications 230, as a non-limiting example. The constraints may include total cost, a quantity or ratio of renewable energy use, an environmental impact, or the like. The optimization model 244 may output selected energy resources for satisfying the forecasted energy demand for the one or more facilities based on the input data, and the selected energy resources may be provided as input data to the recommendation model 246. Additional details of selecting energy resources and prioritizing or optimizing constraints are described herein with reference to FIG. 5.

The recommendation model 246 may include one or more ML models configured to select one or more recommended actions to reduce or compensate for the environmental impact associated with the selected energy resources. In some implementations, the recommendation model 246 may include or correspond to the third set of ML models 134 of FIG. 1. The recommendation model 246 may be trained based on data from the data sources 202, such as the vendor agreements and renewable energy specifications 230 and the socio-economic features 232, as non-limiting examples, and the recommendation model 246 may receive input data including the selected energy resources from the optimization model 244 and input from the data sources 202, such as the socio-economic features 232, as a non-limiting example. The recommendation model 246 may output one or more recommended actions to be performed by the organization based on the input data. Additional details of forecasting energy demand are described herein with reference to FIG. 8.

The end user application 206 may receive output of the data processing and ML models 204 and may display a GUI that includes information for a user. The end user application 206 may be executed at a user device, such as a computing device or a mobile device of a user (e.g., an employee of the organization, etc.). In some implementations, the end user application 208 may automatically initiate one or more actions based on the output of the data processing and ML models 204. To illustrate, the end user application 206 may receive a forecasted energy demand 250, a forecasted energy generation 252, and one or more recommended actions 254 from the data processing and ML models 204. The forecasted energy demand 250 may be an output of the energy demand forecasting models 242. In some implementations, the one or more facilities may be equipped with one or more energy generation sources, and the energy demand forecasting models 242 may also output the forecasted energy generation 252. The recommended actions 254 may be an output of the recommendation model 246. The end user application 206 may generate and display, via the GUI, an energy plan 256 to display information to the user. The energy plan 256 may include the forecasted energy demand 250, the forecasted energy generation 252, the recommended actions 254, other information, or a combination thereof. An example of an energy plan is shown further below with reference to FIG. 7. In some implementations, the end user application 206 may be configured to initiate operation of at least one of the recommended actions 254.

The system 200 may enable use of various input data, such as historic energy demand or generation data, output of IoT devices such as digital energy meters, video feeds, people counts, temperatures, and the like as input for the data processing and ML models 204 to prioritize or maximize use of renewable energy. In some implementations, the energy demand or generation may be forecasted for multiple different types of renewable energy, such as solar power, wind power, hydroelectric power, and the like. Additionally or alternatively, the energy plan 256 may be generated based on financial models for energy demand and cost optimization. The system 200 also provides recommended actions to offset emissions or other environmental impacts of the energy resources selected to satisfy the forecasted energy demand.

Figure 3:
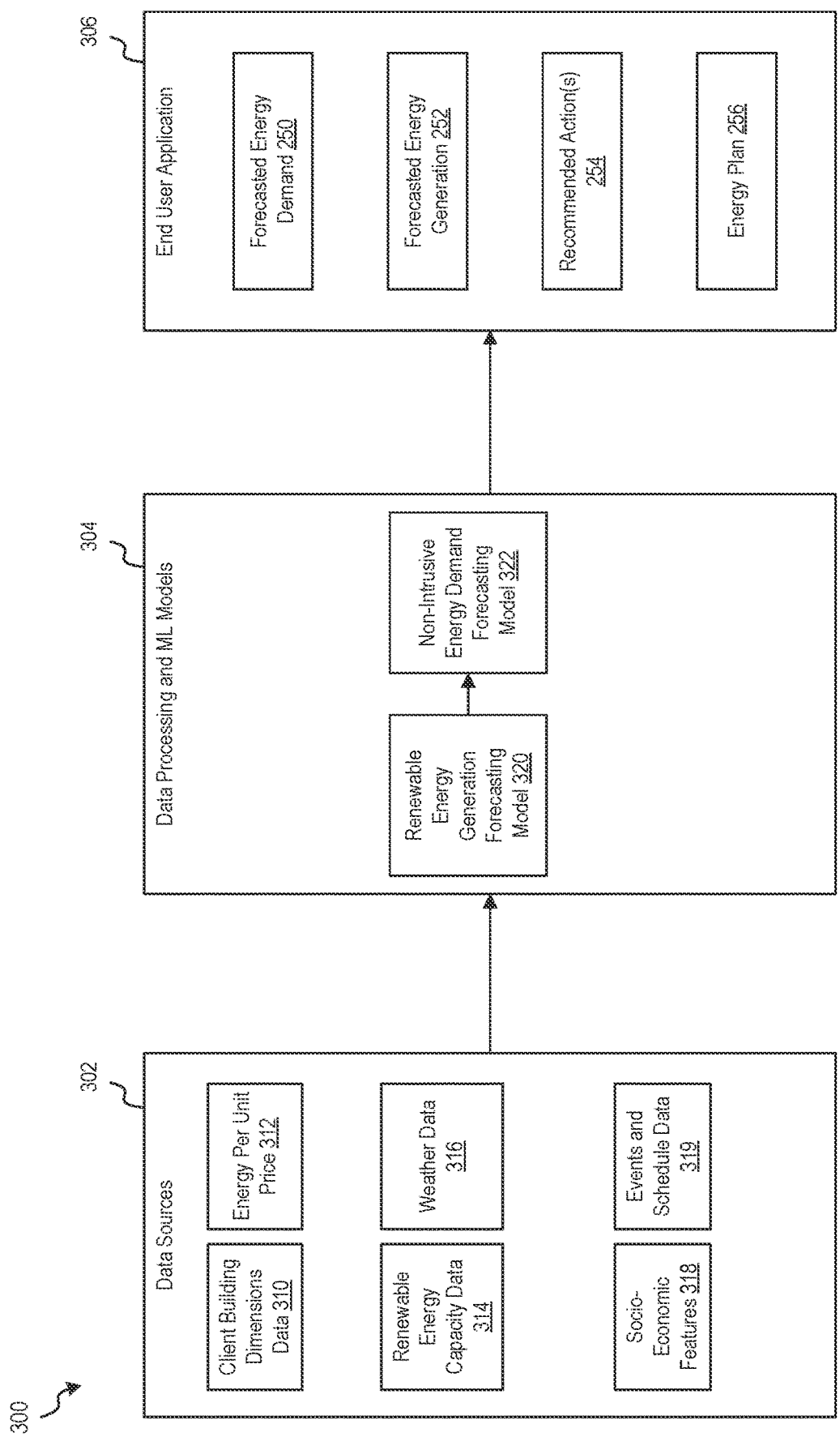
FIG. 3 is a block diagram of an example of a system that supports forecasting energy demand and generating an energy plan for an energy supplier according to one or more aspects.

Referring to FIG. 3, an example of a system that supports "non-intrusive" forecasting energy demand and generating an energy plan for an energy supplier according to one or more aspects is shown as a system 300. The system 300 is similar to the system 200 of FIG. 2, except that the system 300 is configured to generate information for an energy supplier instead of an organization with energy resource needs. As shown in FIG. 3, the system 300 includes data sources 302, data processing and ML models 304, and an end user application 306. The end user application 306 may be the same as the end user application 206 of FIG. 2.

The data sources 302 include non-intrusive data sources that may be accessed by an energy supplier without requiring permission from, or access to private or protected data of, one or more clients (e.g., energy purchasers). For example, non-intrusive data may include publically available data, such as data hosted on the Internet, data from publically accessible satellite images, data from non-private social media networks, and the like. In the example shown in FIG. 3, the data sources 302 may include client building dimensions data 310, energy per unit price 312, renewable energy capacity data 314, weather data 316, socio-economic features 318, and events and schedule data 319. In other implementations, the data sources 302 may include more or fewer sources, such as any of the data sources 202 of FIG. 2 that can be non-intrusively accessed. The client building dimensions data 310 may indicate dimensions of one or more facilities operated by clients, such as area, a number of rooms, a number of floors, a personnel capacity, type of industry (e.g., banking, healthcare, information technology, manufacturing industry, etc.), or the like. The energy per unit price 312 indicates price per unit of energy offered by the energy supplier, and may vary based on the energy supplier, the type of energy (e.g., renewable/sustainable or non-renewable/non-sustainable, or types of renewable/sustainable energy and types of non-renewable/non-sustainable energy), the time of year, or the like. The renewable energy capacity data 314 may indicate an amount of renewable energy that is capable of being generated by one or more clients (e.g., using one or more installed renewable energy resources at the one or more facilities). The weather data 316 may indicate historic or predicted weather conditions, temperatures, humidity, barometric pressure, or the like, affecting the one or more facilities of the clients. The socio-economic features 318 may include information indicating socio-economic benefits that correspond to renewable resources, such as decreased costs, government incentives, employee happiness, public perception, business relationships, and the like. The events and schedule data 319 may include information indicating scheduled events for the clients, such as conferences, social events, media events, and the like, work or shift schedules (if non-intrusively obtainable), scheduled interviews, scheduled guests, manufacturing schedules, and the like.

The data processing and ML models 304 may include a non-intrusive energy demand forecasting model 322 and a renewable energy generation forecasting model 320. The renewable energy generation forecasting model 320 may include one or more ML models configured to forecast an amount of renewable energy that can be generated by the clients. The renewable energy generation forecasting model 320 may be trained based on non-intrusive data collected from the data sources 302, such as the renewable energy capacity data 314, as a non-limiting example, and data maintained by the energy supplier, such as historic renewable energy generation data, estimated energy outputs of available renewable energy resources, contracts for renewable energy with other customers, and the like, and the renewable energy generation forecasting model 320 may receive input data including input from the data sources 302, such as the weather data 316, as a non-limiting example, and other data. The renewable energy generation forecasting model 320 may output a forecasted quantity of generated energy from renewable energy resources based on the input data.

The non-intrusive energy demand forecasting model 322 may include one or more ML models configured to forecast an energy demand that corresponds to one or more customers of the energy supplier. The non-intrusive energy demand forecasting model 322 may be trained based on non-intrusive data collected from the data sources 302, such as the client building dimensions data 310, as a non-limiting example, and the non-intrusive energy demand forecasting model 322 may receive input data including input from the data sources 302, such as the weather data 316 and the events and schedule data 319, as non-limiting examples. The non-intrusive energy demand forecasting model 322 may output a forecasted energy demand for one or more customers based on the input data.

Similar to the end user application 206 of FIG. 2, the end user application 306 of FIG. 3 may display the energy plan 256, such as via a GUI at a display device, to output the energy plan 256 to a user. The energy plan 256 may include the forecasted energy demand 250, the forecasted energy generation 252, other information, or a combination thereof (e.g., the recommended actions 254 may not be included in the energy plan 256 for an energy supplier). The forecasted energy demand 250 and the forecasted energy generation 252 may be received by the end user application 306 from the data processing and ML models 304. For example, the forecasted energy demand 250 may be output by the non-intrusive energy demand forecasting model 322, and the forecasted energy generation 252 may be output by the renewable energy generation forecasting model 320.

The system 300 may enable use of various input data, such as historic energy demand or generation data, output of IoT devices such as digital energy meters, video feeds, people counts, temperatures, and the like as input for the data processing and ML models 304 to prioritize or maximize use of renewable energy. In some implementations, the energy demand or generation may be forecasted based on building type or industry associated with the customers, local weather, building parameters (e.g., number of floors, area, typical occupancy, etc.). More accurately forecasting energy demand may enable the energy supplier to balance an electric grid using more renewable energy resources. Additionally or alternatively, the energy generation may be forecasted by particular types of energy resources, such as solar, wind, etc., that may each have different forecasts due to different parameters and conditions associated with the respective types of energy resources.

Figure 4:
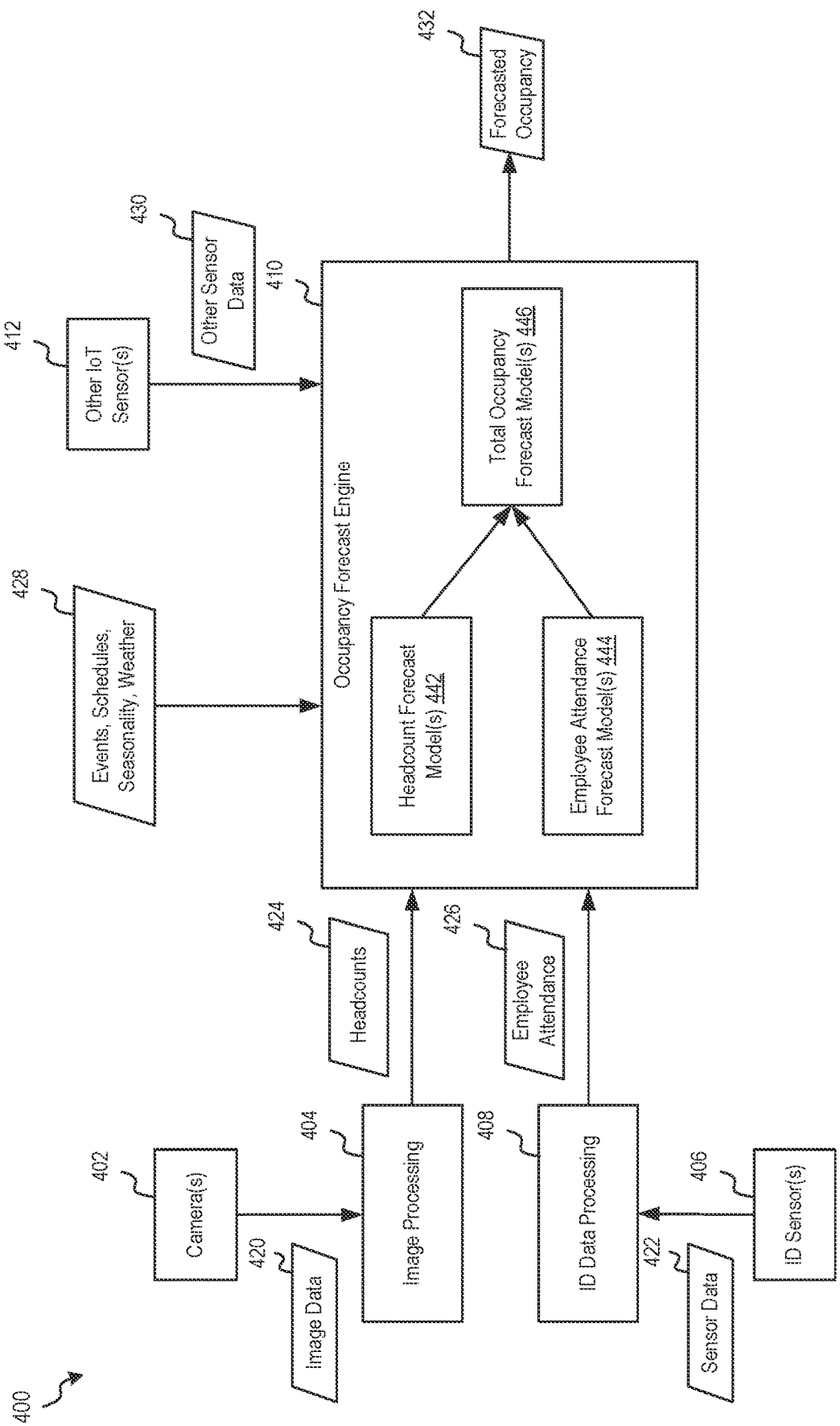
FIG. 4 is a block diagram of an example of a system configured to forecast occupancy according to one or more aspects.

Referring to FIG. 4, an example of a system configured to forecast occupancy according to one or more aspects is shown as a system 400. The forecasted occupancy may correspond to one or more facilities of an organization, such as a business or other entity. In some implementations, the system 400 may be included in or integrated within one or more systems (or components thereof) for forecasting energy demand and recommending actions, such as the system 100 of FIG. 1, the system 200 of FIG. 2, or the system 300 of FIG. 3. As shown in FIG. 4, the system 400 includes one or more cameras 402, one or more ID sensors 406, one or more other IoT sensors 412, and an occupancy forecast engine 410. The cameras 402, the ID sensors 406, and the other IoT sensors 412 may be communicatively coupled to the occupancy forecast engine 410, such as via one or more networks. In some implementations, the cameras 402, the ID sensors 406, and the other IoT sensors 412 may be located at different geographic locations than the occupancy forecast engine 410, such as at the one or more facilities.

The cameras 402 may include one or more security cameras, facial recognition cameras, telepresence cameras, or the like, that are distributed across the one or more facilities. Image data 420 that is output by the cameras 402 may be processed, at image processing 404, to generate headcounts 424. For example, the image data 420 may be processed to count a number of unique faces or other indicators of individual persons included in the image data 420 corresponding to one or more time periods. As non-limiting examples, the image processing 404 may include performing facial recognition operations, object recognition operations (e.g., the objects including people, identifier badges, or other items that signify people, etc.), or the like to determine a number of people on-site at the one or more facilities. The headcounts 424 may include employees, board members, owners, contractors, guests, event attendees, interviewees, other visitors, and the like. The headcounts 424 may be provided as input to the occupancy forecast engine 410.

The ID sensors 406 may include one or more ID badge scanners, biometric scanners, seat sensors, or other sensors that are distributed across the one or more facilities and configured to detect the presence of employees. Sensor data 422 that is output by the ID sensors 406 may be processed, at ID processing 408, to generate employee attendance 426. For example, the sensor data 422 may be processed to count a number of unique employee identifications indicated by the sensor data 422 corresponding to one or more time periods. The employee attendance 426 may indicate a total number of employees, information associated with the identified employees, a duration of detection of the employee, other information, or a combination thereof, for various time periods such as hourly, daily, weekly, monthly, etc. or an attendance that is updated in real-time. The employee attendance 426 may be provided as input data to the occupancy forecast engine 410.

The other IoT sensors 412 may include one or more sensors or other IoT devices, such as temperature sensors included in smart thermostats or smart lights, motion sensors, light sensors, pressure sensors, and the like, that are distributed across the one or more facilities. Other sensor data 430 that is output by the other IoT sensors 412 may be provided as input data to the occupancy forecast engine 410. Events, schedules, seasonality, and weather data 428 may also be provided as an input to the occupancy forecast engine 410. The events, schedules, seasonality, and weather data 428 may include data associated with events scheduled to occur at the one or more facilities, schedules for employees, holidays, interviews, and the like at the one or more facilities, season-specific operations (e.g., reduced workforce during manufacturing down times, reduced shifts during winter or holiday seasons, increased operating hours during summer, etc.) at the one or more facilities, weather forecasts associated with the one or more facilities, other information, or a combination thereof.

The occupancy forecast engine 410 may be configured to forecast (e.g., predict) a forecasted occupancy 432 associated with the one or more facilities based on input data (e.g., the headcounts 424, the employee attendance 426, the events, schedules, seasonality, and weather data 428, and the other sensor data 430). In some implementations, the occupancy forecast engine 410 may include or correspond to the occupancy forecast engine 122 of FIG. 1. To illustrate, the occupancy forecast engine 410 may forecast initial occupancy values based on historic occupancy values associated with similar input headcounts or input employee attendance, and the occupancy forecast engine 410 may modify the initial occupancy values based on input IoT sensor data that may capture additional occupancy information, scheduling and events information indicating upcoming occupancy fluctuations, seasonal and weather data, other information, or a combination thereof, to generate the forecasted occupancy 432.

In some implementations, the occupancy forecast engine 410 may include or access multiple ML models to forecast the forecasted occupancy 432, such as one or more headcount forecast models 442, one or more employee attendance forecast models 444, and one or more total occupancy forecast models 446. In some implementations, the headcount forecast models 442, the employee attendance forecast models 444, and the total occupancy forecast models 446 may include or correspond to the fourth set of ML models 136 of FIG. 1 or the total occupancy model 240 of FIG. 2. The headcount forecast models 442 may include one or more ML models that are trained to forecast a headcount for one or more time periods based on input headcount data. For example, the headcount forecast models 442 may receive the headcounts 424 as input data and may output a forecasted headcount (e.g., of employees, visitors, others, etc.) that is provided as an input to the total occupancy forecast models 446. The employee attendance forecast models 444 may include one or more ML models that are trained to forecast an employee attendance for one or more time periods based on input employee attendance data. For example, the employee attendance forecast models 444 may receive the employee attendance 426 as input data and may output a forecasted employee attendance that is provided as an input to the total occupancy forecast models 446. The total occupancy forecast models 446 may include one or more ML models that are trained to forecast a total occupancy at the one or more locations based on input headcounts and employee attendance, and optionally other sensor data inputs and/or event, schedule, seasonality, and weather data input. For example, the total occupancy forecast models 446 may forecast the forecasted occupancy 432 based on the output of the headcount forecast models 442, the output of the employee attendance forecast models 444, the events, schedules, seasonality, and weather data 428, and the other sensor data 430. The forecasted occupancy 432 may be used to forecast energy demand corresponding to the one or more facilities, such that the forecasted energy demand is proportional to the forecasted occupancy 432, as further described herein.

Figure 5:
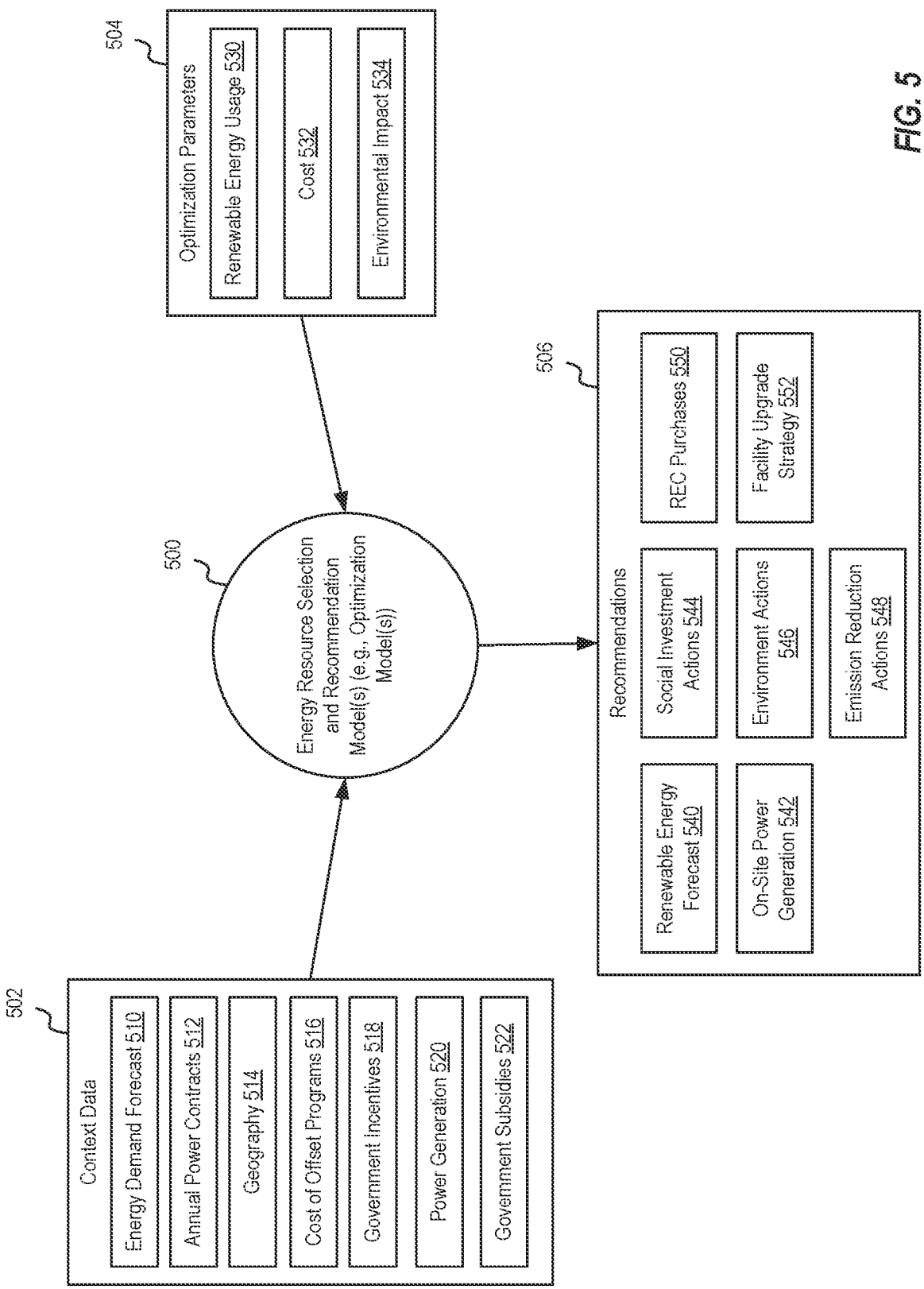
FIG. 5 is a block diagram of an example of one or more energy resource selection and recommendation models according to one or more aspects.

Referring to FIG. 5, an example of an one or more resource selection and recommendation models according to one or more aspects is shown as one or more selection/recommendation models 500. In some implementations, the selection/recommendation models 500 may be included in or integrated within one or more systems (or components thereof) for forecasting energy demand and recommending actions, such as the system 100 of FIG. 1, the system 200 of FIG. 2, or the system 300 of FIG. 3. For example, the selection/recommendation models 500 may include or correspond to the first set of ML models 130 (accessed or integrated within the energy demand forecast engine 124) of FIG. 1, the second set of ML models 132 (accessed or integrated within the resource selection engine 126) of FIG. 1, the energy demand forecasting models 242 of FIG. 2, the optimization model 244 of FIG. 2, the non-intrusive energy demand forecasting model 322 of FIG. 3, or any combination thereof. The selection/recommendation models 500 may include one or more ML models that are trained to select energy resources to satisfy forecasted energy demands while prioritizing, or optimizing, one or more parameters. The selection/recommendation models 500 may also include one or more ML models that are trained to select one or more actions to recommend to offset an environmental impact associated with use of the selected energy resources.

As shown in FIG. 5, the selection/recommendation models 500 are configured to receive context data 502 and optimization parameters 504 as input for selecting energy resources to be acquired to satisfy forecasted energy demand at one or more facilities of an organization and for generating recommendations 506. The context data 502 includes data that indicates energy needs, parameters associated with available energy resources, information associated with the one or more facilities, government or regulatory programs for increasing renewable energy use, and the like. In the example shown in FIG. 5, the context data 502 indicates an energy demand forecast 510, annual power contracts 512, geography 514, cost of offset programs 516, government incentives 518, power generation 520, and government subsidies 522. The energy demand forecast 510 may indicate an amount of energy that is forecasted to be used by the one or more facilities during one or more upcoming time periods. The annual power contracts 512 may indicate contracts for historic energy purchases that correspond to the one or more facilities. Although referred to as annual, the contracts may be for any duration (e.g., weekly, monthly, etc.). The geography 514 may indicate geographic locations of the one or more facilities, climate information associated with the geographic locations, and the like. The cost of offset programs 516 may indicate the cost of various environmental impact offset programs or activities, such as planting trees, purchasing RECs, and the like. The government incentives 518 may indicate one or more financial incentives offered by a government or regulatory agency for using renewable energy resources. The power generation 520 may include information associated with on-site power generation at the one or more locations, such as energy resource type, quantity, cost, and the like. The government subsidies 522 may indicate one or more financial or other subsidies offered by a government or regulatory agency for using renewable energy resources.

The optimization parameters 504 may include any constraint or parameter that is to be prioritized, or optimized, by the selection/recommendation models 500. For example, the optimization parameters 504 may include renewable energy usage 530 (e.g., a particular quantity, a particular ratio, etc.), a cost 532 of the selected energy resources and any recommended actions, and an environmental impact 534 associated with use of the selected energy resources and any recommended actions. The environmental impact 534 may include an amount of carbon ($CO_2$) emissions, a volume of liquid emissions, an amount of solid waste results, or other information that represents an impact of using the selected energy resources on the environment. Although shown in FIG. 5 as including three parameters, any of the parameters 530-534 may be included alone or with another of the parameters 530-534 instead of the optimization parameters 504 including all three of the parameters 530-534. In other implementations, the optimization parameters 504 may include different parameters than those shown in FIG. 5.

The selection/recommendation models 500 may receive the context data 502 and the optimization parameters 504 and select one or more available energy resources to be acquired and one or more actions to be performed to offset the environmental impact while prioritizing, or optimizing, the optimization parameters 504. The output of the selection/recommendation models 500 may include indication of the selected energy resources (e.g., quantities of energy to be acquired for each type of selected energy resource) and the recommendations 506. In some implementations, additional processing or other operations may be performed on the output to generate some of the recommendations 506. The recommendations 506 include changes to operation at the one or more facilities, actions that may be performed with respect to the environment, actions that may be performed with respect to a government or regulatory agency, and the like. In the example shown in FIG. 5, the recommendations 506 include a renewable energy forecast 540, on-site power generation 542, social investment actions 544, environment actions 546, emission reduction actions 548, REC purchases 550, and a facility upgrade strategy 552. In other implementations, the recommendations 506 may include more or fewer recommendations or different recommendations.

The renewable energy forecast 540 may indicate a forecasted amount of energy to be supplied using renewable energy resources, such as wind power, solar power, hydroelectric power, or the like. The renewable energy forecast 540 may be a portion of the energy demand forecast 510. The on-site power generation 542 may indicate an amount of power to be generated by on-site power generation sources at the one or more facilities. If the on-site power generation 542 is greater than a maximum amount of energy provided by energy supply sources currently located at the one or more facilities, recommendations for expanding on-site power generation by obtaining addition energy supply sources, particular renewable/sustainable energy supply sources, may be included in the recommendations 506. For example, a recommendation may include adding a particular number of solar panels to one or more buildings located at the one or more facilities. The social investment actions 544 may include actions that invest in community or organizational environmental improvement operations or funds, such as establishing litter cleanup groups, stream cleaning groups, emergency cleanup response funds, renewable energy education programs, or the like. The environment actions 546 may include actions performed in the environment, such as planting trees, flowers, grasses, or other vegetation, performing actions to reclaim environmentally degraded locations such as strip mines, expanding clean water sources, and the like. The emission reduction actions 548 may include actions with the organization or at the one or more facilities to reduce carbon emissions, such as installing carbon scrubbers on exhaust pipes, migrating computing operations from multiple servers distributed across the one or more facilities to more efficient cloud-based servers, or the like. The REC purchases 550 may include purchasing RECs or other investments that fund environmental offset actions by others. The facility upgrade strategy 552 may include recommendations for replacing equipment with newer, less environmentally damaging models of the equipment, upgrading to more efficient equipment that improves operations without increasing emissions, or the like.

In some implementations, one or more of the recommendations 506 may be performed automatically. For example, a system may initiate purchase of RECs electronically. As another example, the system may communicate with a solar panel manufacturer to order multiple solar panels, and the system may schedule contractors to install the solar panels at the one or more facilities. Additionally or alternatively, the recommendations 506 may be displayed to a user, such as via a GUI, with instructions for performing one or more of the recommendations 506. Although described as being performed on an organization-basis (e.g., the energy plan and recommendations are generated for net results across all the facilities), in other implementations, the energy plans and/or recommendations can be generated for other groupings, such as geographic regions (e.g., cities, states, countries, etc.), business groupings (e.g., manufacturing, management, sales, etc.), or the like. For example, an energy plan and recommendations may be generated for a particular region that includes three facilities, such that an environmental impact of one facility is offset by actions and renewable energy generated at the other two facilities.

Figure 6:
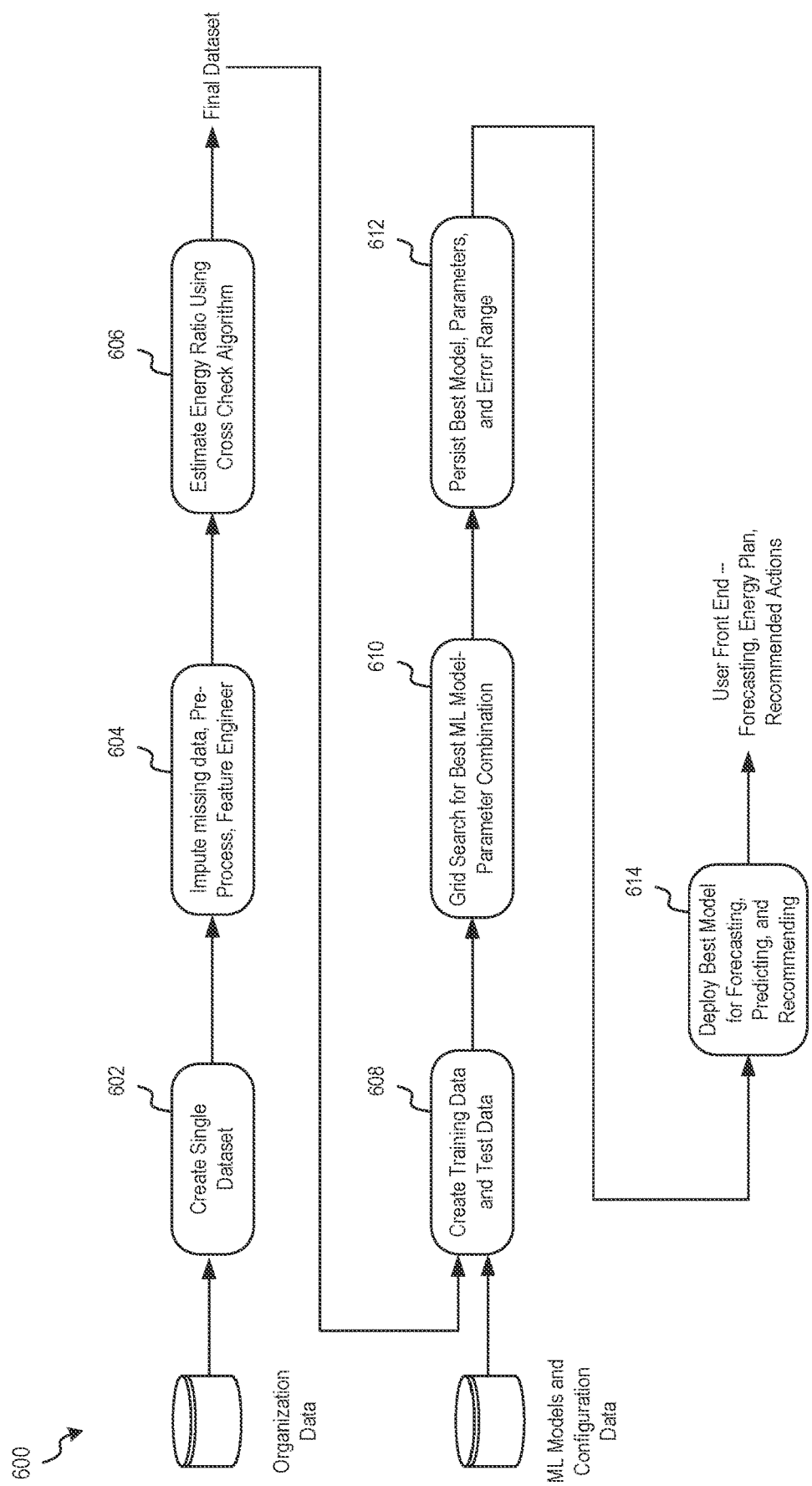
FIG. 6 is a flow diagram illustrating an example of a method implementing one or more machine learning (ML) models for forecasting energy demand, generating energy plans, and recommending actions according to one or more aspects.

Referring to FIG. 6, a flow diagram of an example of a method for implementing one or more ML models for forecasting energy demand, generating energy plans, and recommending actions according to one or more aspects is shown as a method 600. In some implementations, the operations of the method 600 may be stored as instructions that, when executed by one or more processors (e.g., the one or more processors of a computing device or a server), cause the one or more processors to perform the operations of the method 600. In some implementations, the method 600 may be performed by a computing device, such as the energy forecast device 102 of FIG. 1.

The method 600 includes creating a single dataset, at 602. For example, the computing device may fetch data from one or more sources of organization data associated with an organization that operates one or more facilities for which energy demand is to be forecast. The sources may include databases, servers, sensors, cameras, IoT devices, and the like. The data may be aggregated as needed to create the single data set, which may include sensor data, image data, headcount data, historic occupancy data, historical energy demand data, event and scheduling data, date/time information, seasonal data, employee data, energy supplier data, environmental impact data, government or regulatory agency data, and the like.

The method 600 includes imputing missing data, pre-processing the data, and performing feature engineering, at 604. Imputing missing data from the single dataset may be performed using extrapolation, gradient descent, or other techniques, as further described herein. Pre-processing the data may include converting the data to a common format, reducing the complexity of the data, or other pre-processing operations. The feature engineering may identify a subset of highly relevant features for training one or more ML models and discarding other features to reduce a complexity of training processes. Upon completion of the operations at 606, a final dataset is generated. The method 600 includes creating training data and test data, at 608. For example, the final data set may be divided into a first portion to be used as training data and a second portion to be used as test data. The training data and test data may be selected in accordance with the ML model parameters and configuration data to be used during the training process.

The method 600 includes performing a grid search for the best ML model parameter combination, at 610. For example, multiple different ML models (corresponding to different sets of parameters) may be trained using the training data. The trained models may be tested using the test data, and the models having the highest accuracies or other desired characteristics (e.g., sizes of the parameter sets, speed, etc.) are identified as the "best" ML models (e.g., the best ML model parameter combinations). In some implementations, a grid search may be performed to identify hyperparameter values resulting in the best ML models. The method 600 includes persisting the best models, parameters, and error range, at 612. For example, the parameter sets and hyperparameters representing the best ML models, and the respective error range, may be output for use in forecasting, while the unselected ML models may be discarded. The method 600 includes deploying the best model for forecasting, predicting, and recommending, at 614. For example, the best ML model(s) may be deployed to servers or user devices for use in forecasting occupancies, forecasting energy demands, selecting energy resources, recommending offset actions, or a combination thereof, as described with reference to FIGS. 1-5. These ML models may be implemented by the same or different devices that execute a user front-end application that provides a GUI enabling a user to receive an energy plan that is generated based on the output of the best ML models.

Referring to FIG. 7, an example energy plan according to one or more aspects is shown as an energy plan 700. In some implementations, the energy plan 700 may include or correspond to the energy plan 180 of FIG. 1. In some implementations, the energy plan 700 may be displayed as part of a GUI by a computing device, such as the energy forecast device 102 of FIG. 1, a user or client device, or the like.

The energy plan 700 indicates information related to energy demand forecasts, selected energy resources, and environmental impact for one or more facilities of an organization. For example, the energy plan 700 may include an annual demand forecast, whether incentives are available for renewable energy use, a renewable energy forecast, a renewable energy procurement forecast, a conventional energy forecast, potential emissions, environmental offset recommendations, net emissions, total costs, other information, or a combination thereof. In some implementations, as shown in FIG. 7, the energy plan 700 may be organized by facility. In other implementations, the energy plan 700 may be organized in other manners, such as by region, by operations, by cost, or the like.

The information presented in the energy plan 700 may provide a user with an understanding of forecasted energy use, for renewable energy resources and non-renewable energy resources (or other types of energy resources), associated costs, environmental impacts, particular actions such as planting trees and purchasing RECs recommended to offset the environmental impacts, associated costs, net environmental impacts, and total costs. For example, a particular facility "BDC10" may have a forecasted energy demand of 7.6 million kilowatt-hours (kwh), a forecasted renewable energy procurement of 6 million kwh, and a forecasted conventional energy procurement of 1.6 million kwh. The forecasted conventional energy may correspond to 1247 tons of carbon emissions. To offset this environmental impact, 14,994 trees are recommended to be planted and 317 RECs are recommended to be purchased, corresponding to emission offsets and costs of 1000 tons and $2.975 million and 247 tons and $0.377 million, respectively. The recommended actions result in net emissions of 0 (e.g., the offset provided by the recommended actions completely offsets the impact of the conventional energy resource procurement). A total cost associated with all the energy resource procurement and recommended actions for the facility "BDC10" is $3.352 million. Examples for other facilities are shown in FIG. 7. Although the actions to offset the environmental impact shown in FIG. 7 include planting trees and purchasing RECs, in other implementations, other actions (and associated costs) may be included in the energy plan 700, such as social investments (e.g., investing in agencies or organizations that perform activities to improve the environment), cloud migration (e.g., reducing energy use by using cloud-based resources for storing at least some data or performing various computations instead of individual, onsite computing devices), or the like. Additionally or alternatively, the system may be configured to support provision for custom recommendations for inclusion in the energy plan 700.

Figure 8:
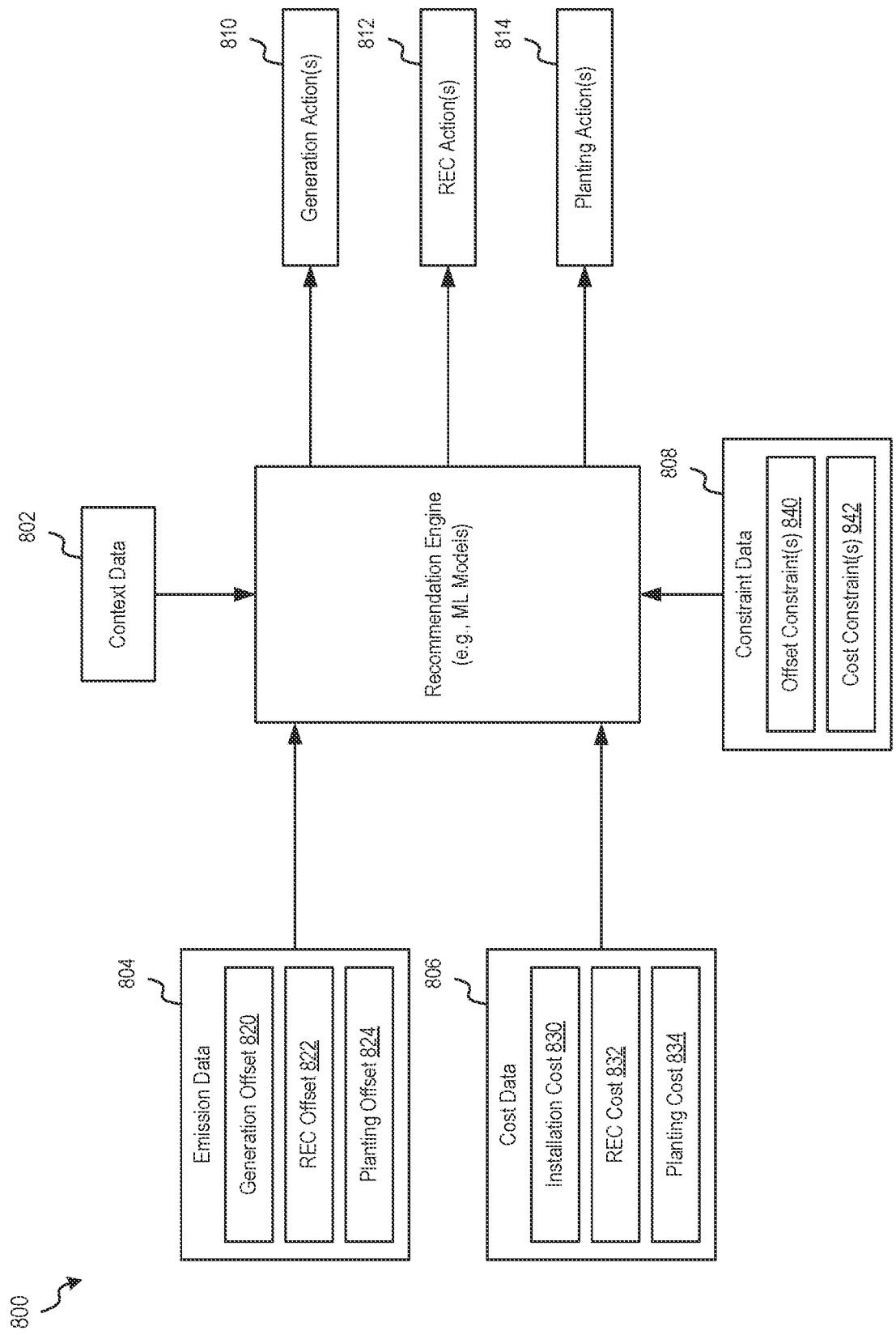
FIG. 8 is a block diagram of an example of a recommendation engine according to one or more aspects.

Referring to FIG. 8, an example of a recommendation engine according to one or more aspects is shown as a recommendation engine 800. In some implementations, the recommendation engine 800 may be included in or integrated within one or more systems (or components thereof) for forecasting energy demand and recommending actions, such as the system 100 of FIG. 1, system 200 of FIG. 2, or system 300 of FIG. 3. For example, the recommendation engine 800 may include or correspond to the action recommendation engine 128 of FIG. 1 or may include or access the recommendation model 246.

The recommendation engine 800 may be configured to receive various input data and to select one or more recommended actions from multiple preset (e.g., pre-stored or predefined) offset actions. As shown in FIG. 8, the inputs may include context data 802, emission data 804, cost data 806, and constraint data 808, and the recommended actions may include generation actions 810, REC actions 812, and planting actions 814. In other examples, the recommendation engine 800 may receive more or fewer than four inputs and may output more or fewer than three recommended actions.

The context data 802 may indicate the context for which the offset actions are to be recommended. For example, the context data 802 may indicate selected energy resources that are to be acquired for use by an organization to power one or more facilities, forecasted energy demand corresponding to the one or more facilities, location data, government or regulation data, other context information, or a combination thereof. The emission data 804 may indicate an environmental impact corresponding to use of various energy resources. For example, the emission data 804 may indicate a quantity of $CO_2$ (or another compound or chemical) emissions expected to result from use of particular energy resources, such as non-renewable energy resources such as coal, oil, natural gas, etc. The emission data 804 may also indicate an environmental offset (e.g., a positive environmental impact) expected to result from use of other particular energy resources. For example, the emission data 804 may indicate quantities of $CO_2$ emissions that are offset by use of renewable/sustainable energy resources, such as wind power, solar power, hydroelectric power, etc. As a particular example, the emissions data 804 may indicate a generation offset 820 corresponding to renewable energy generation ("$G_e$"), an REC offset 822 corresponding to purchase of RECs ("$R_e$"), and a planting offset 824 corresponding to planting trees ("$P_C$"), in tons of $CO_2$.

The cost data 806 may indicate costs associated with acquiring various energy resources. For example, the cost data 806 may indicate the cost of electricity from various sources, such as electric grids, coal-burning power plants, wind farms, solar farms, hydroelectric dams, diesel suppliers, or the like. As a particular example, the cost data 806 may include an installation cost 830 for installing renewable energy sources ("$G_e$") capable of offsetting one ton of emissions, an REC cost 832 of purchasing RECs to offset one ton of emissions ("$R_c$"), and a planting cost 834 for planting trees to offset one ton of emissions ("$P_c$"). The constraint data 808 may indicate one or more constraints to be prioritized or optimized when recommending offset actions. For example, the constraint data 808 may indicate an offset constraint 840, a cost constraint 842, a quantity of renewable/sustainable energy constraint, or the like. As a particular example, the constraint data 808 may indicate the offset constraint 840 ("K"), such that the offset constraint 840 is related to the total recommended actions by $X*G_e + Y*R_e + Z*P_e >= K$, and the cost constraint 842 ("L"), such that the total cost of the recommended actions is related to the cost constraint 842 by Investment Cost<L.

The recommendation engine 800 may select the one or more recommended actions based on the context data 802, the emission data 804, the cost data 806, and the constraint data 808 to recommend one or more actions that offset the environmental impact associated with selected energy resources, particularly non-renewable/non-sustainable energy resources. For example, the recommendation engine 800 may recommend one or more actions associated with a sufficient emissions offset to reduce or compensate for the emissions that correspond to the selected non-renewable energy resources. In some implementations, the recommendation engine 800 may prioritize, or optimize, for one or more of the constraints indicated by the constraint data 808. For example, if the constraint data 808 includes the offset constraint 840 and the cost constraint 842, the recommendation engine 800 may recommend actions that result in an offset that is equal to the emissions of non-renewable resources indicated by the emission data 804 and that have a total cost that does not exceed the cost constraint 842, if possible. As a particular example, the recommendation engine 800 may attempt to maximize an emission offset $f(G_e, R_e, P_e)$ and minimize an investment cost $f(G_c, R_c, P_c)$ according to $*f(G_e, R_e, P_e)+1-\beta*f(Gc, Rc, P_c)$. If satisfying both constraints is not possible, the recommendation engine 800 may recommend actions that come the closest to satisfying a lower-priority constraint while satisfying a higher-priority constraint. For example, if the cost constraint 842 has a higher priority than the offset constraint 840, the recommendation engine 800 may recommend actions that maximize the emission offset while satisfying an investment cost threshold. In some implementations, the recommendation engine 800 may include or access one or more ML models that are trained to recommend actions from the offset actions based on input data and in view of one or more constraints. For example, the recommendation engine 800 may include or access the third set of ML models 134 of FIG. 1 or the recommendation model 246 of FIG. 2.

The recommended actions may include multiple types of actions, such as the generation actions 810, the REC actions 812, the planting actions 814, other actions, or a combination thereof. The generation actions 810 may include one or more actions to invest in renewable energy generation at the one or more facilities or to acquire energy from renewable energy resource suppliers. For example, the generation actions 810 may include purchasing and installing solar panels or wind turbines at the one or more facilities, purchasing electricity from an electric grid supplied by hydroelectric power, or the like.

The REC actions 812 may include one or more actions to purchase RECs or otherwise invest in investments or organizations that financially or otherwise support the use, investment in, education regarding, or the like, for renewable energy resources. For example, the REC actions 812 may include recommendations to purchase various quantities of RECs based to achieve a target emissions offset. Additionally or alternatively, the REC actions 812 may include any actions with respect to a government or regulatory body to satisfy a renewable energy regulation. The planting actions 814 may include actions to plant trees, grasses, or other vegetation that convert $CO_2$ into oxygen in order to offset $CO_2$ emissions. For example, the planting actions 814 may include recommendations to plant and maintain various numbers of trees to achieve a target emissions offset. Any of the generation actions 810, the REC actions 812, the planting actions 814, or a combination thereof, may be automatically initiated or performed by a system or displayed to a user to enable manual performance of the actions, as described above with reference to FIG. 1.

Figure 9:
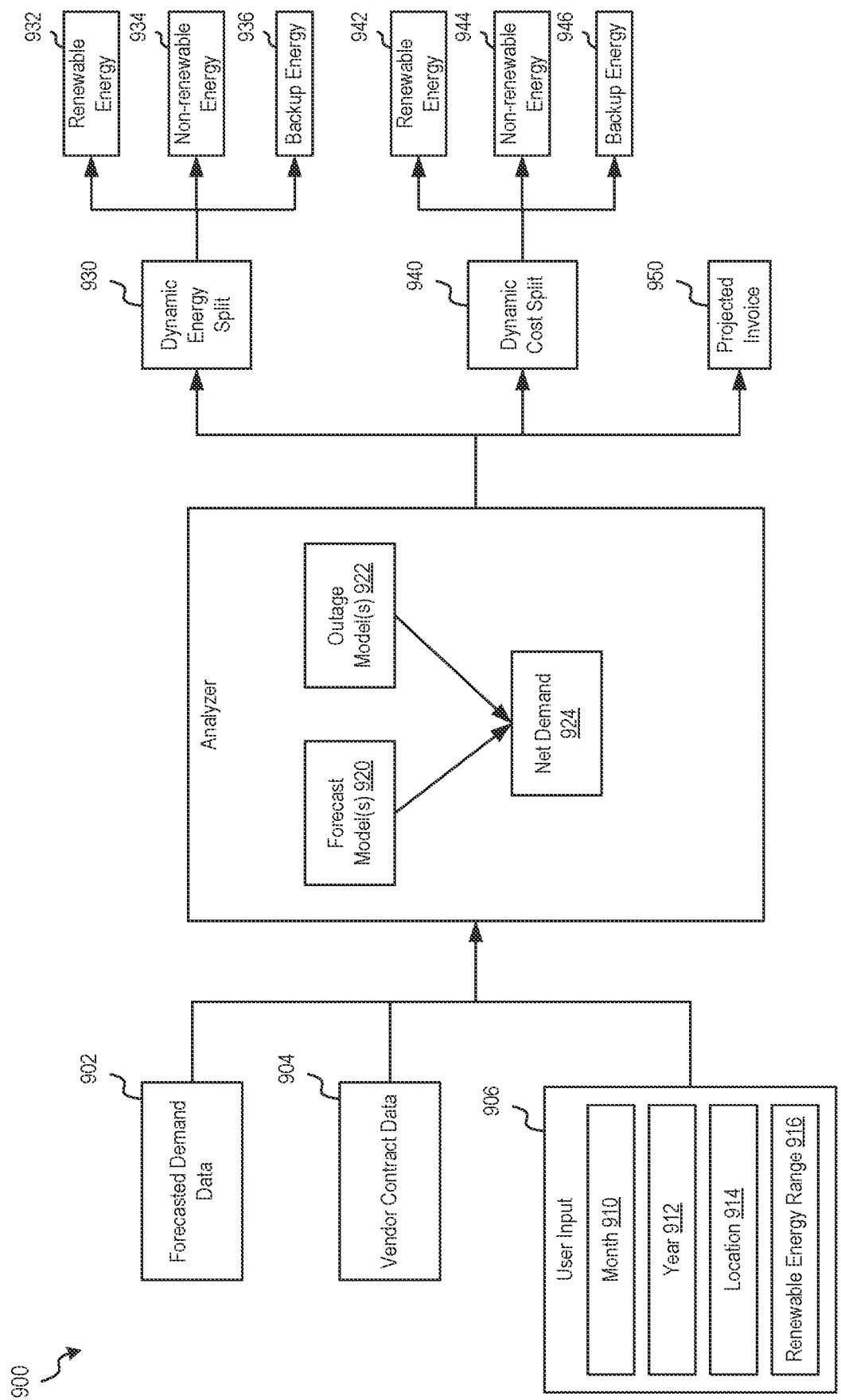
FIG. 9 is a block diagram of an example of an analyzer for generating energy plans according to one or more aspects.

Referring to FIG. 9, an example of an analyzer for generating energy plans according to one or more aspects is shown as an analyzer 900. Generating the energy plans may include modelling one or more scenarios, such as forecasting energy demand, energy resource selection, and offset action performance. In some implementations, the analyzer 900 may be included in or integrated within one or more systems (or components thereof) for forecasting energy demand and recommending actions, such as the system 100 of FIG. 1, the system 200 of FIG. 2, or the system 300 of FIG. 3.

The analyzer 900 may be configured to receive various input data and to generate an energy plan for an organization that operates one or more facilities. As shown in FIG. 9, the input data may include forecasted demand data 902, vendor contract data 904, and user input 906, and the energy plan may include dynamic energy split information 930, dynamic cost split information 940, and a projected invoice 950. In other examples, the analyzer 900 may receive more or fewer than three inputs and may output an energy plan that includes more or fewer than three components.

The forecasted demand data 902 may indicate forecasted energy demand for the one or more facilities. For example, the forecasted demand data 902 may approximate the forecasted energy demand 114 of FIG. 1 and/or approximate an output of the energy demand forecasting models 242 of FIG. 2. In some implementations, the forecasted demand data 902 may include forecasted outage data indicating one or more forecasted power outages at the one or more facilities. The vendor contract data 904 may indicate information associated with energy resources contracted to be received from one or more energy suppliers. For example, the vendor contract data 904 may indicate available or contracted quantities of energy resources, costs of the available or contracted energy resources, substitute energy resources such as renewable energy resources, or the like.

The user input 906 may include one or more parameters for use in generating the energy plan, one or more constraints, other information, or a combination thereof. The user input 906 may be dynamic or based on previously received user input during one or more periodic operations of the analyzer 900. In the example shown in FIG. 9, the user input 906 includes a month 910, a year 912, a location 914, and a renewable energy range 916. In other implementations, the user input 906 may include fewer than four or more than four data components. The month 910 and the year 912 may indicate a particular date for which an energy plan is to be generated, a starting point or ending point of a time period for which the energy plan is to be generated, or the like. The location 914 may indicate one or more of the locations of the one or more facilities for which the energy plan is to be generated, a region (which may include one or multiple facilities) for which the energy plan is to be generated, or the like. The renewable energy range 916 may indicate a range of renewable energy resources available to the organization, a range of renewable energy resources to constrain the energy plan, such as a range mandated by a government or regulatory agency or a target range desired by the organization, or the like.

The analyzer 900 may include or access one or more ML models configured to model scenarios or otherwise generate the energy plan to be output by the analyzer 900. In the example shown in FIG. 9, the analyzer 900 may include one or more forecast models 920 and one or more outage models 922. The forecast models 920 may be trained to forecast (e.g., select) energy resources to be included in the energy plan based on historical energy demand data, historical energy resource and vendor contract data, historical user input or constraints, and the like. The forecast models 920 may forecast (e.g., select) a set of energy resources from the available energy resources indicated by the vendor contract data 904 that satisfy a forecasted energy demand indicated by the forecasted demand data 902. In some implementations, the set of energy resources may correspond to particular time periods or locations indicated by the user input 906. Additionally or alternatively, the set of energy resources may satisfy one or more constraints indicated by the user input 906, such as the renewable energy range 916.

The outage models 922 may be trained to forecast outages for the one or more facilities based on historic outage data and the like. The outage models 922 may forecast outages based on forecasted outages data included in the forecasted demand data 902 (or otherwise obtained by the analyzer 900). The analyzer 900 may aggregate (or otherwise combine) the demand forecast output by the forecast models 920 and the forecasted outages from the outage models 922 to generate a net demand 924 (e.g., a net forecasted energy demand that accounts for outages) and the energy resources selected to satisfy the net demand 924. For example, the net demand 924 may include the forecasted demand (and corresponding selected energy resources) output by the forecast models 920 adjusted based on the output of the outage models 922. To further illustrate, the net demand 924 may include a combination of a forecasted energy demand output by the forecast models 920 and a backup energy demand equal to (or based on) energy corresponding to the forecasted outages output by the outage models 922, and the net demand 924 may be satisfied by a selection of renewable and non-renewable energy resources that correspond to the output of the forecast models 920 and a selection of backup energy resources that correspond to the output of the outage models 922. In some implementations, the net demand 924 may include or correspond to the forecasted energy demand 114 of FIG. 1 and/or the output of the energy demand forecasting models 242 of FIG. 2.

The analyzer 900 may generate the energy plan based on the net demand 924. The energy plan may indicate the net demand 924 and energy resources selected to satisfy the net demand 924, costs associated with the selected energy resources, an overall invoice, other information, or a combination thereof. For example, the dynamic energy split information 930 may indicate multiple different types of energy resources selected to satisfy the net demand 924, the dynamic cost split information 940 may indicate the costs of the selected energy resources, and the projected invoice 950 may indicate estimated costs for each energy supplier, for each facility, for recommended actions (as described with reference to FIGS. 7-8), an estimated total cost, and the like. The dynamic energy split information 930 may indicate quantities of the selected energy resources organized into multiple categories, such as quantities of renewable energy resources 932 (e.g., solar power, wind power, hydroelectric power, etc.), quantities of non-renewable energy resources 934 (e.g., oil, coal, natural gas, etc.), and quantities of backup energy resources 936 (e.g., more stable or reliable energy resources such as diesel generators). The dynamic cost split information 940 may indicate costs of the selected energy resources organized into multiple categories, such as cost of renewable energy resources 942, cost of non-renewable energy resources 944, and cost of backup energy resources 946.

Figure 10:
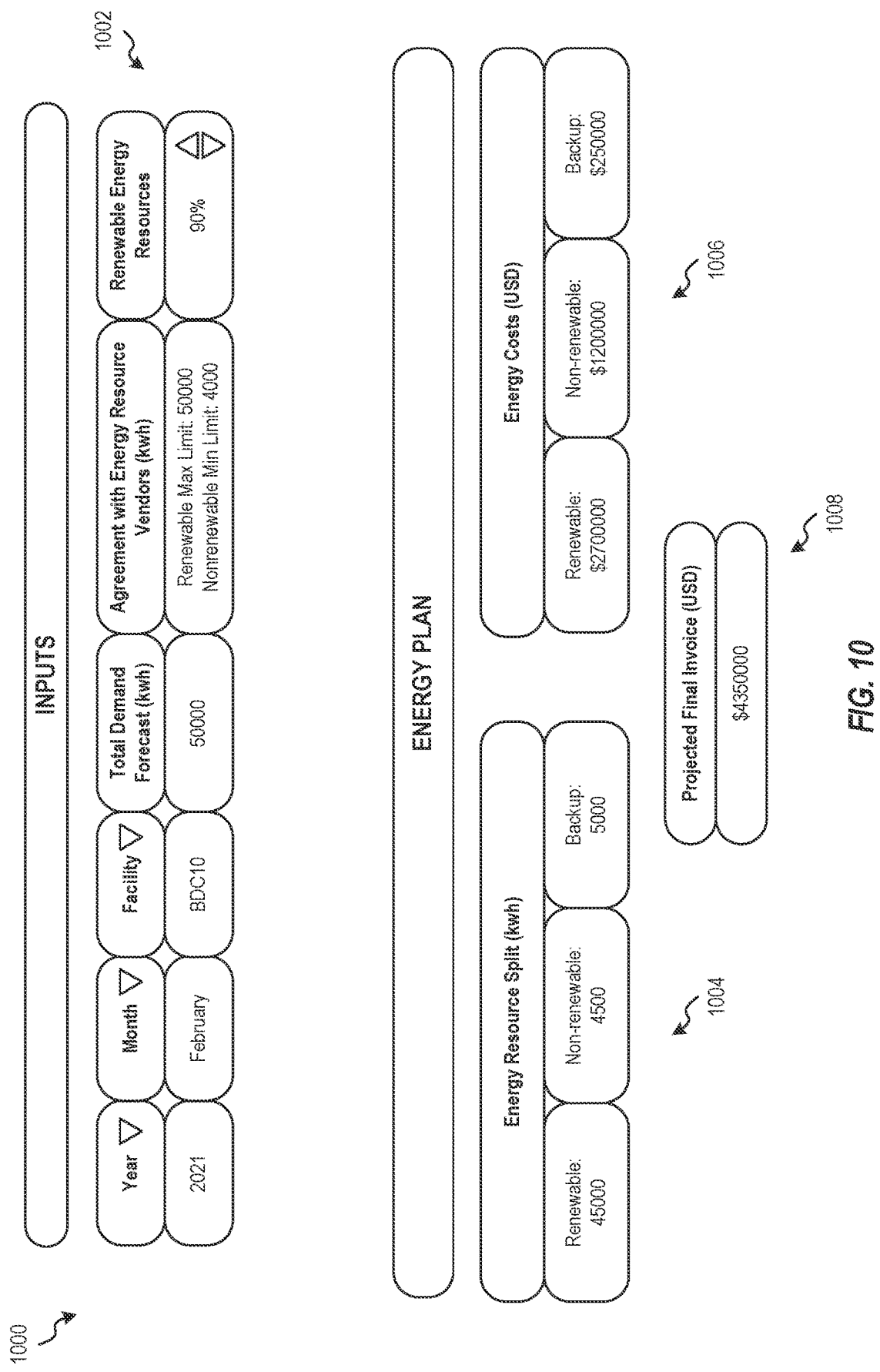
FIG. 10 shows an example graphic user interface (GUI) that supports display of an energy plan according to one or more aspects.

Referring to FIG. 10, an example GUI that supports display of an energy plan according to one or more aspects is shown as a GUI 1000. In some implementations, the GUI 1000 may be displayed via a computing device configured to display energy plans and related information, such as the energy forecast device 102 of FIG. 1 or a user or client device, the end user application 206 of FIG. 2, or the end user application 306 of FIG. 3. In some implementations, the GUI 1000 may include or correspond to the energy plan 180 of FIG. 1, the energy plan 700 of FIG. 7, or the energy plan (including the dynamic energy split information 930, the dynamic cost split information 940, and the projected invoice 950) of FIG. 9.

The GUI 1000 may include multiple inputs 1002 and an energy plan based on the inputs 1002. The inputs 1002 may include multiple dynamically modifiable parameters used to generate the energy plan. In the example shown in FIG. 10, the inputs 1002 include a year input, a month input, a facility input, a total forecasted demand input, a vendor contract input, and a renewable energy input. The year input and the month input may be used to indicate a particular date or time period for which the energy plan is to be generated. The facility input may be used to indicate one or more particular facilities for which the energy plan is to be generated. The total forecasted demand input may be used to indicate a forecasted energy demand for the one or more particular facilities. The vendor contract input may be used to indicate vendor information or constraints for available energy resources, such as a maximum quantity of renewable energy resources and a minimum quantity of non-renewable energy resources, as non-limiting examples. The renewable energy input may be used to indicate a target quantity, ratio, or range of renewable resources to be included in the energy plan. In other examples, the inputs 1002 may include more than six or fewer than six parameters, any of which may be different parameters than illustrated in FIG. 10.

One or more of the inputs 1002 may be user configurable to enter the respective parameter value. For example, the year input and the month input may include selectable drop-down lists that enable a user to select a year and a month, respectively (or some other time period). As another example, the renewable energy input may include user selectable buttons that enable a user to increase or decrease a value of the renewable energy resource parameter. Additionally or alternatively, one or more of the inputs 1002 may be automatically populated. For example, the total forecasted demand input may be automatically populated by using the net demand 924 of FIG. 9.

After receipt of the parameter values corresponding to the inputs 1002, the energy plan may be displayed within the GUI 1000. In some implementations, the energy plan may include multiple categories of information, such as a first category 1004, a second category 1006, and a third category 1008. The first category 1004 may include quantities of various types of energy resources that are recommended to satisfy the forecasted energy demand associated with the selected facility during the selected time period while satisfying the selected vendor contract constraints and the renewable energy resource input. For example, the first category 1004 may include quantities of renewable energy resources, non-renewable energy resources, and backup energy resources. The second category 1006 may include costs of various types of energy resources that are recommended to satisfy the forecasted energy demand associated with the selected facility during the selected time period while satisfying the selected vendor contract constraints and the renewable energy resource input. For example, the second category 1006 may include costs of renewable energy resources, non-renewable energy resources, and backup energy resources. The third category 1008 may include a projected final invoice, such as a total cost associated with all the selected energy resources. In some implementations, the first category 1004, the second category 1006, and the third category 1008 may include or correspond to the dynamic energy split information 930, the dynamic cost split information 940, and the projected invoice 950 of FIG. 9, respectively. In other examples, the energy plan may include more than three or fewer than three categories of information, including other categories of information than are shown in FIG. 10. For example, the energy plan may include additional details such as those shown in FIG. 7.

Figure 11:
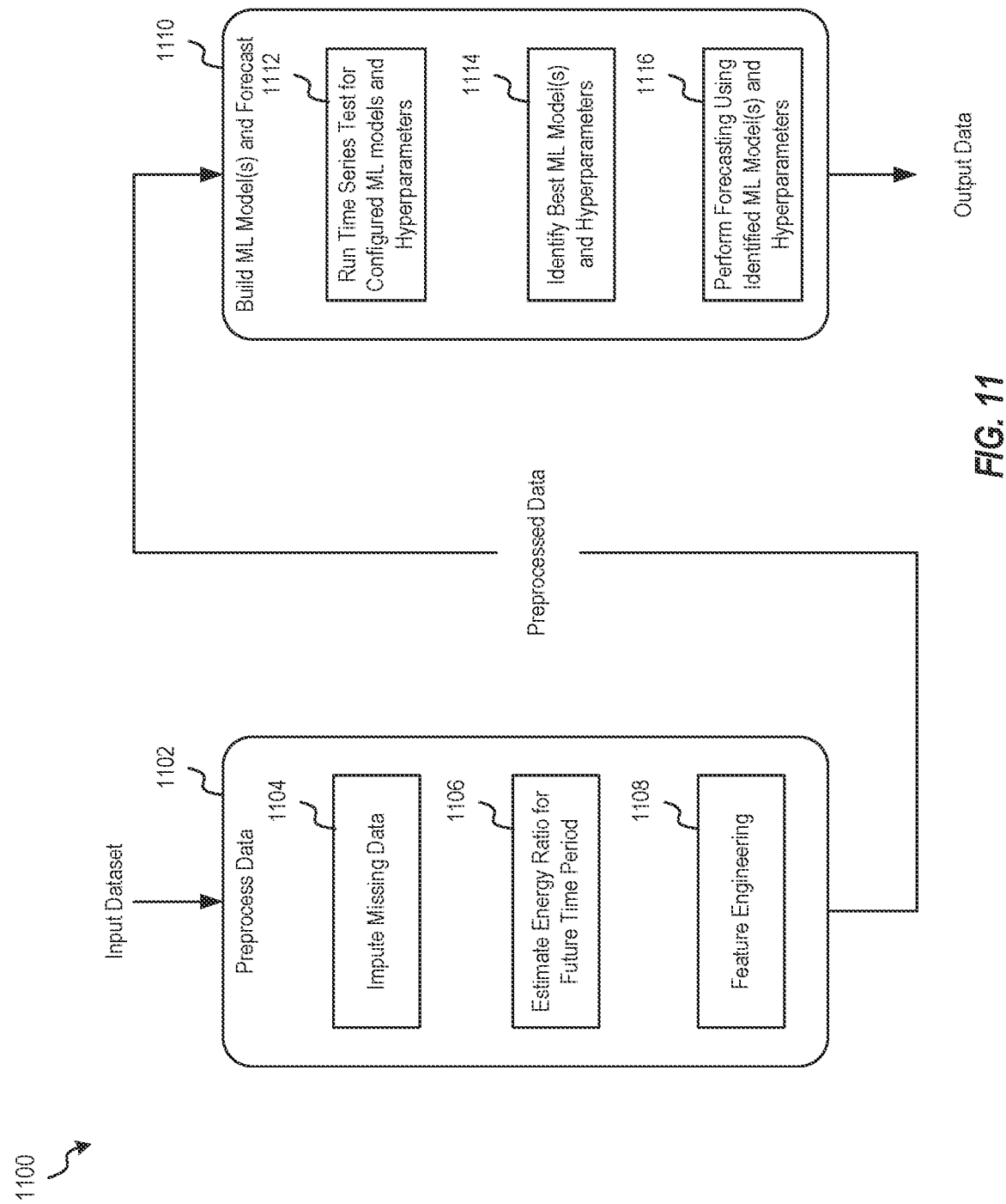
FIG. 11 is a flow diagram illustrating an example of a method for preprocessing input data and building ML model(s) for forecasting energy demand according to one or more aspects.

Referring to FIG. 11, a flow diagram of an example of a method for preprocessing input data and building ML model(s) for forecasting energy demand according to one or more aspects is shown as a method 1100. In some implementations, the operations of the method 1100 may be stored as instructions that, when executed by one or more processors (e.g., the one or more processors of a computing device or a server), cause the one or more processors to perform the operations of the method 1100. In some implementations, the method 1100 may be performed by a computing device, such as the energy forecast device 102 of FIG. 1, or devices or systems that train the data processing and ML models 204 of FIG. 2 or the data processing and ML models 304 of FIG. 3. Although described with reference to building ML models for forecasting energy demand, similar techniques may be leveraged to build ML models for forecasting occupancy, for selecting energy resources, for recommending actions, or for other purposes.

The method 1100 includes pre-processing data, at 1102. For example, an input dataset may be received or obtained from one or more sources, such as sensors, cameras, IoT devices, databases, servers, user devices, or the like, and the input dataset may be pre-processed to generate training data and testing data for use in building and training one or more ML models. Pre-processing the input data includes imputing missing data, at 1104. For example, if the input dataset includes periodic energy meter data (e.g., hourly, daily, weekly, etc.) for which some entries are missing or unusable, replacement values may be imputed. In some implementations, the values may be imputed using gradient descent, as further described herein with reference to FIG. 12. Pre-processing the input data includes estimating an energy ratio for a future time period, at 1106. For example, the energy ration may be estimated based on additional related information, such as forecasted occupancy, scheduling data, event data, seasonality data, and the like, as described above. Pre-processing the input data includes performing feature engineering, at 1108. For example, the system may perform statistical analysis on the input data to identify one or more statistically relevant features. Additionally or alternatively, the relevant features may be selected based on user input, such as that of a data scientist. Low priority (e.g., statistically less relevant) features may be discarded to reduce the size and complexity of the pre-processed data.

The method 1100 also includes building one or more ML models and forecasting energy demand, at 1110. For example, the pre-processed data may be segmented into training data and test data to be used to build (e.g., train) one or more ML models to perform energy demand forecasting. Building the ML models and forecasting the energy demand includes performing run-time time series testing for configured ML models and hyperparameters, at 1112. For example, time series testing may be performed to identify multiple ML models to train using the test data and hyperparameters to adjust during the training process. Building the ML models and forecasting the energy demand includes identifying the "best" ML models and hyperparameters, at 1114. For example, the test data may be used to identify one or more best performing ML models, such as ML models having the highest accuracy, the best tradeoff between accuracy and complexity, or the like. Additionally or alternatively, a grid search may be performed to identify one or more best performing hyperparameter values, such as a number of training epochs, an accuracy threshold, permitted adjustments to ML models during training, or the like. Building the ML models and forecasting the energy demand includes performing energy demand forecasting using the identified ML models and hyperparameters, at 1116. For example, the identified best performing ML models and corresponding hyperparameters may be deployed, and optionally further trained using more specific or updated training data related to a particular organization or energy supplier, to be used in forecasting energy demand at one or more facilities of an organization.

Figure 12:
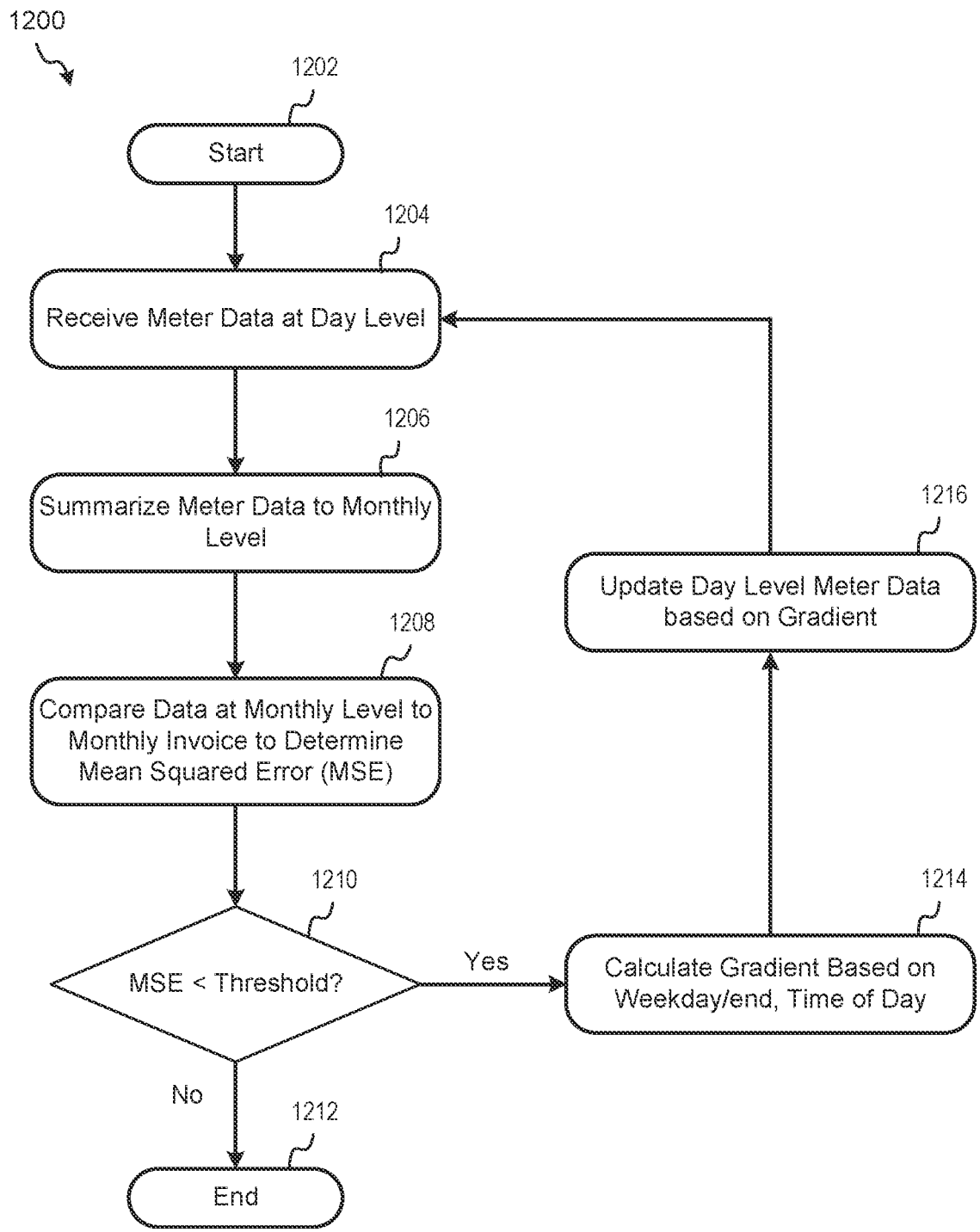
FIG. 12 is a flow diagram illustrating an example of a method for pre-processing historical energy demand data for use as training data according to one or more aspects.

Referring to FIG. 12, a flow diagram of an example of a method for pre-processing historical energy demand data for use as training data according to one or more aspects is shown as a method 1200. In some implementations, the operations of the method 1200 may be stored as instructions that, when executed by one or more processors (e.g., the one or more processors of a computing device or a server), cause the one or more processors to perform the operations of the method 1200. In some implementations, the method 1200 may be performed by a computing device, such as the energy forecast device 102 of FIG. 1, or devices or systems that train the data processing and ML models 204 of FIG. 2 or the data processing and ML models 304 of FIG. 3.

The method 1200 starts at 1202 and includes receiving meter data at day level, at 1204. For example, the system may receive meter data (e.g., energy use data) from one or more energy meters, or other sensors or IoT devices, distributed at one or more facilities of an organization. The meter data may be compiled and received daily (e.g., at the "day level"), or periodically according to any other duration (e.g., hourly, weekly, monthly, etc.). The method 1200 includes summarizing the meter data to the monthly level, at 1206. For example, the meter data at the daily level may be aggregated, averaged, or otherwise summarized into data entries on a monthly basis (e.g., at the "monthly level"). Summarizing the meter data at the daily level may include extrapolating one or more missing or otherwise useful values to be used to convert the meter data from the daily level to the monthly level. For example, the meter data may be provided for some, but not all days of each month, and the missing days may not have a set pattern.

The method 1200 includes comparing the meter data at the monthly level to monthly invoices to determine a mean squared error (MSE), at 1208. For example, the meter data corresponding to a particular month may be summed or otherwise combined to generate a metered energy reading for the particular month, and the metered energy reading may be compared to an amount of energy purchased for the particular month (indicated by the monthly invoice) to determine the MSE. The comparison may be for a total amount of energy, or may be by various categories, such as facility, region, energy resource type, or the like. The method 1200 includes comparing the MSE to a threshold, at 1210. If the MSE does not satisfy (e.g., is less than) the threshold, the method 1200 ends at 1212. Alternatively, if the MSE is greater than or equal to the threshold, the method 1200 continues to 1214, where a gradient is calculated based on weekdays, weekends, or time of day. For example, the gradient may be calculated based on meter data captures on weekdays, meter data captured on weekends, meter data captured at particular times of day, or any other granularity or level. The level or granularity is referred to as the step size. The method 1200 includes updating the day level meter data based on the gradient, at 1216. For example, the meter data at the day level may be updated using gradient descent based on the gradient. For example, the step size of a value of an intercept of the gradient and the meter data may be subtracted to get a new value of the intercept, and the process may be performed iteratively to include additional values in or update values of the meter data at the day level. After updating the meter data at the day level, the method 1200 returns to 1204, such that the updated meter data at the day level is received and prepared for summarization.

As described above, the method 1200 supports automated filling of missing input data. For example, if input meter data is missing a particular amount (e.g., 50%, as a non-limiting example), the method 1200 may impute the missing data with a smaller Mean Squared Error (MSE) than conventional data imputing techniques. To illustrate, initializing variables on the basis of particular time periods of the meter data, such as weekdays, weekends, particular times of day, and the like, may improve the accuracy as compared to imputing the data as a single group of inputs. Additionally, use of the gradient descent process in a loop, until a sufficient MSE is reached or a particular number of iterations are completed, results in more accurate imputed data as compared against the monthly invoices. As an example, the method 1200 may decrease a MSE from 13% (without the techniques of the method 1200) to 1.13%.

Figure 13:
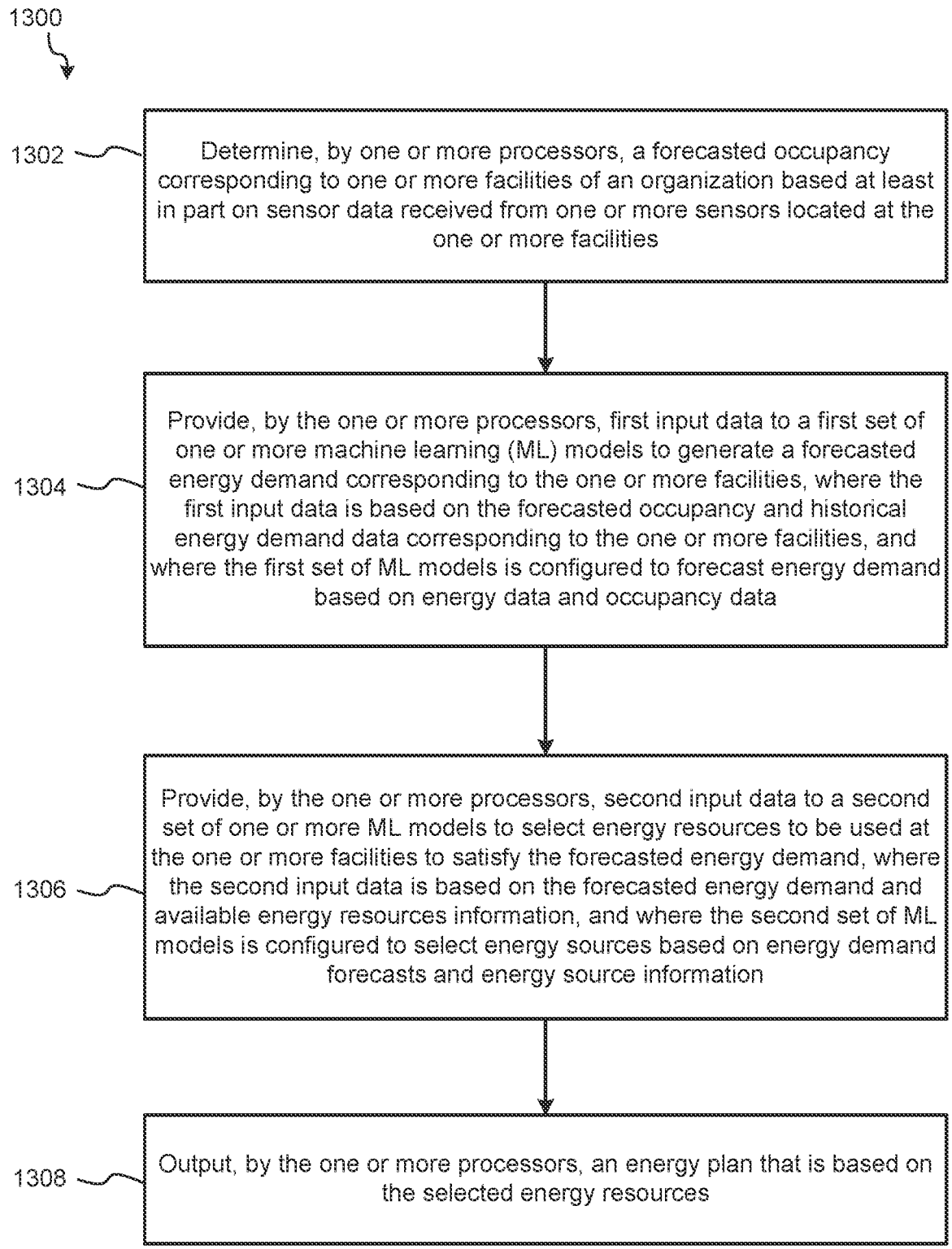
FIG. 13 is a flow diagram illustrating an example of a method for forecasting energy demand using machine learning according to one or more aspects.

Referring to FIG. 13, a flow diagram of an example of a method for forecasting energy demand using machine learning according to one or more aspects is shown as a method 1300. In some implementations, the operations of the method 1300 may be stored as instructions that, when executed by one or more processors (e.g., the one or more processors of a computing device or a server), cause the one or more processors to perform the operations of the method 1300. In some implementations, the method 1300 may be performed by a computing device, such as the energy forecast device 102 of FIG. 1 (e.g., a computing device configured for forecasting energy demand, generating an energy plan, and selecting recommended actions for reducing environment impact, using ML models), one or more components of the system 200 of FIG. 2, or one or more components of the system 300 of FIG. 3.

The method 1300 includes determining a forecasted occupancy corresponding to one or more facilities of an organization based at least in part on sensor data received from one or more sensors located at the one or more facilities, at 1302. For example, the forecasted occupancy may include or correspond to the forecasted occupancy 112 of FIG. 1, the one or more facilities may include or correspond to the facilities 154-156 of FIG. 1, the sensor data may include or correspond to sensor data 170-172 of FIG. 1, and the one or more sensors may include the sensors 140 and 146 of FIG. 1.

The method 1300 includes providing first input data to a first set of one or more ML models to generate a forecasted energy demand corresponding to the one or more facilities, at 1304. For example, the first set of ML models may include or correspond to first set of ML models 130 of FIG. 1 and the forecasted energy demand may include or correspond to the forecasted energy demand 114 of FIG. 1. The first input data is based on the forecasted occupancy and historical energy demand data corresponding to the one or more facilities, and the first set of ML models is configured to forecast energy demand based on energy data and occupancy data. For example, the forecasted occupancy may include or correspond to the forecasted occupancy 112 of FIG. 1, and the historical energy demand data may include or correspond to a portion of the facility data 110 of FIG. 1.

The method 1300 includes providing second input data to a second set of one or more ML models to select energy resources to be used at the one or more facilities to satisfy the forecasted energy demand, at 1306. For example, the second set of ML models may include or correspond to second set of ML models 132 of FIG. 1, and the selected energy resources may include or correspond to the selected energy resources 116 of FIG. 1. The second input data is based on the forecasted energy demand and available energy resources information, and the second set of ML models is configured to select energy sources based on energy demand forecasts and energy source information. For example, the available energy resources information may include or correspond to the available energy information 174 of FIG. 1. The method 1300 includes outputting an energy plan that is based on the selected energy resources, at 1308. For example, the energy plan may include or correspond to energy plan 180 of FIG. 1.

In some implementations, the energy plan indicates, for each energy resource of the selected energy resources, a quantity of the energy resource and a cost associated with the energy resource. For example, the energy plan may indicate quantity and cost details as shown in FIG. 7. Additionally or alternatively, outputting the energy plan may include initiating display of the energy plan. For example, the one or more communication interfaces 120 of FIG. 1 may output the display of the energy plan 180 to a display device, or the energy forecast device 102 may output the energy plan 180 for display at a client or user device. In some implementations, the method 1300 further includes initiating one or more actions to acquire the selected energy resources. For example, one or more actions may include or correspond to the acquirement actions 182 of FIG. 1.

In some implementations, the energy plan indicates one or more recommended actions to offset an environmental impact associated with use of the selected energy resources. For example, the one or more recommended actions may include or correspond to the recommended actions 184 of FIG. 1. In some such implementations, the method 1300 further includes initiating performance of at least one of the one or more recommended actions. For example, the energy forecast device 102 of FIG. 1 may initiate or perform at least one of the recommended actions 184 of FIG. 1. Additionally or alternatively, the one or more recommended actions may include planting trees, reconfiguring one or more systems at the one or more facilities, ceasing operation of particular equipment at the one or more facilities, obtaining one or more RECs, or a combination thereof. For example, the one or more recommended actions may include any of the recommended actions described herein with reference to FIGS. 1, 7, and 8. Additionally or alternatively, the method 1300 may further include comparing a net environmental impact estimate corresponding to the selected energy resources to one or more thresholds. In some such implementations, the method 1300 further includes selecting the one or more recommended actions from a plurality of actions based on the comparing. For example, the net environmental impact may be determined based on the emission data 804 of FIG. 8, and the one or more thresholds may include or correspond to the constraint data 808 of FIG. 8. Additionally or alternatively, the method 1300 may further include providing third input data to a third set of one or more ML models to select the one or more recommended actions. For example, the third set of ML models may include or correspond to the third set of ML models 134 of FIG. 1. In some such implementations, the third input data is based on the selected energy resources, environmental impact data associated with the selected energy resources, and environmental impact data associated with a plurality of actions. For example, the third input data may be based on the context data 802, the emission data 804, and the cost data 806 of FIG. 8. In some such implementations, the third set of one or more ML models is configured to select one or more actions of the plurality of actions to offset an environmental impact of energy resource use and an environmental impact of the selected one or more actions. For example, the environmental impact of energy resource use may include or correspond to the emission data 804, and the environmental impact of the selected one or more actions may include the generation offset 820, the REC offset 822, and the planting offset 824 of FIG. 8.

In some implementations, the method 1300 further includes providing fourth input data to a fourth set of one or more ML models to generate the forecasted occupancy. For example, the fourth set of ML models may include or correspond to the fourth ML set of ML models 136 of FIG. 1. In some such implementations, the fourth input data is based on the sensor data, processed image data, event and schedule data, and a current date. For example, the sensor data may include or correspond to the sensor data 170-172 of FIG. 1 and the event and schedule data and the current date may include or correspond to a portion of the facility data 110 of FIG. 1. In some such implementations, the fourth set of ML models is configured to forecast occupancy at the one or more facilities based on input sensor data, headcounts based on image data, events, schedules, or a combination thereof. For example, the occupancy may be forecasted as further described herein with reference to FIG. 4.

In some implementations, the selected energy resources include at least one renewable energy resource. For example, the selected energy resources 116 of FIG. 1 may include solar power, wind power, hydroelectric power, or a combination thereof. Additionally or alternatively, the one or more sensors may include identification scanners, cameras, temperature sensors, pressure sensors, or a combination thereof. For example, the sensors 140 and 146 of FIG. 1 may include ID badge scanners, cameras, temperature sensors, pressure sensors, or the like. Additionally or alternatively, the selected energy resources include at least one backup energy resource and the second set of ML models is configured to select energy resources based further on predicted outages at the one or more facilities. For example, the selected energy resources 116 of FIG. 1 include diesel for generators (or anther backup energy resource), and the second set of ML models 132 may select the selected energy resources 116 to compensate for one or more predicted outages, as further described with reference to FIG. 9.

In some implementations, the energy resources information indicates available quantities of energy resources, costs associated with energy resources, government incentives associated with particular energy resources, environmental impact associated with energy resources, one or more energy resource thresholds, or a combination thereof, and the second set of ML models is configured to select energy resources based further on the available quantities, the costs, the government incentives, the environmental impact, the one or more energy resource thresholds, or a combination thereof. For example, the second set of ML models 132 may be configured to select the selected energy resources 116 based on the available energy information 174.

In some implementations, the second set of ML models may be configured to optimize a total cost associated with the selected energy resources, a total renewable energy use, an environmental impact offset, or a combination thereof. For example, the second set of ML models 132 of FIG. 1 may be configured to optimize, or prioritize, one or more constraints, as further described with reference to FIG. 5. Additionally or alternatively, the energy plan may indicate the selected energy resources for each facility of the one or more facilities, for each geographic region of one or more geographic regions in which the organization operates, or for each operational group of the organization. For example, the energy plan may indicate information on a facility-by-facility basis, as described with reference to FIG. 7.

In some implementations, the method 1300 may further include training a plurality of ML models to select energy resources based on energy demand forecasts and energy resource information, performing a grid search to select one or more hyperparameter values corresponding to the plurality of ML models, and selecting the second set of ML models from the plurality of ML models based on the grid search. For example, a grid search may be performed to select hyperparameter values, as further described with reference to FIG. 11. Additionally or alternatively, the method 1300 may also include generating additional sensor data, additional historical energy demand data, or both, using gradient descent based on the sensor data or the historical energy demand data. For example, generating additional input sensor data may be performed using gradient descent, as further described with reference to FIG. 12.

As described above, the method 1300 supports forecasting energy demand and generating energy plans that enable increase in the use of renewable/sustainable energy resources and/or a reduced environmental impact corresponding to energy resource use. The forecasted energy demand may be more accurate, due to use of a forecasted occupancy as a basis for forecasting the energy demand, which increases the amount of renewable resources that may be used to satisfy the forecasted energy demand. In some implementations, the method 1300 may output one or more recommended actions for offsetting an environmental impact of selected non-renewable energy resources.

It is noted that other types of devices and functionality may be provided according to aspects of the present disclosure and discussion of specific devices and functionality herein have been provided for purposes of illustration, rather than by way of limitation. It is noted that the operations of the method 600 of FIG. 6, the method 1100 of FIG. 11, the method 1200 of FIG. 12, and the method 1300 of FIG. 13 may be performed in any order, or that operations of one method may be performed during performance of another method, such as the method 1300 of FIG. 13 including one or more operations of the method 1200 of FIG. 12, as a non-limiting example. It is also noted that the method 600 of FIG. 6, the method 1100 of FIG. 11, the method 1200 of FIG. 12, and the method 1300 of FIG. 13 may also include other functionality or operations consistent with the description of the operations of the system 100 of FIG. 1, the system 200 of FIG. 2, the system 300 of FIG. 3, the occupancy forecast engine 410 of FIG. 4, the selection/recommendation models 500 of FIG. 5, the recommendation engine 800 of FIG. 8, or the analyzer 900 of FIG. 9.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-13) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B. and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for forecasting energy demand using machine learning, the method comprising:
determining, by one or more processors, a forecasted occupancy corresponding to one or more facilities of an organization based at least in part on sensor data received from one or more sensors located at the one or more facilities;
providing, by the one or more processors, first input data to a first set of one or more machine learning (ML) models to generate a forecasted energy demand corresponding to the one or more facilities,
wherein the first input data is based on the forecasted occupancy and historical energy demand data corresponding to the one or more facilities, and
wherein the first set of ML models is configured to forecast energy demand based on energy data and occupancy data;
providing, by the one or more processors, second input data to a second set of one or more ML models to select energy resources to be used at the one or more facilities to satisfy the forecasted energy demand,
wherein the second input data is based on the forecasted energy demand and available energy resources information, and
wherein the second set of ML models is configured to select energy sources based on energy demand forecasts and energy source information;
determining, by the one or more processors, an environmental impact as a result of use of the selected energy resources, wherein the environmental impact includes total carbon emissions; total other emissions, total water pollution, physical landscape changes, or a combination thereof as a result of using the selected energy resources;
selecting, by the one or more processors, one or more recommended actions to offset the environmental impact;
outputting, by the one or more processors, an energy plan that is based on the selected energy resources, wherein the energy plan indicates the one or more recommended actions selected to offset the environmental impact; and
initiating, by the one or more processors, one or more actions to acquire the selected energy resources.

2. The method of claim 1, wherein the energy plan indicates, for each energy resource of the selected energy resources, a quantity of the energy resource and a cost associated with the energy resource.

3. The method of claim 1, wherein outputting the energy plan comprises initiating, by the one or more processors, display of the energy plan.

4. The method of claim 1, further comprising initiating, by the one or more processors, performance of at least one of the one or more recommended actions.

5. The method of claim 1, wherein the one or more recommended actions include planting trees, reconfiguring one or more systems at the one or more facilities, ceasing operation of particular equipment at the one or more facilities, obtaining one or more renewable energy certificates, or a combination thereof.

6. The method of claim 1, further comprising:
comparing, by the one or more processors, a net environmental impact estimate corresponding to the selected energy resources to one or more thresholds; and
selecting, by the one or more processors, the one or more recommended actions from a plurality of actions based on the comparing.

7. The method of claim 1, further comprising providing, by the one or more processors, third input data to a third set of one or more ML models to select the one or more recommended actions,
wherein the third input data is based on the selected energy resources, the environmental impact data associated with the selected energy resources, and environmental impact data associated with a plurality of actions, and
wherein the third set of one or more ML models is configured to select one or more actions of the plurality of actions to offset an environmental impact of energy resource use and an environmental impact of the selected one or more actions.

8. The method of claim 1, further comprising providing, by the one or more processors, fourth input data to a fourth set of one or more ML models to generate the forecasted occupancy,
wherein the fourth input data is based on the sensor data, processed image data, event and schedule data, and a current date, and
wherein the fourth set of ML models is configured to forecast occupancy at the one or more facilities based on input sensor data, headcounts based on image data, events, schedules, or a combination thereof.

9. A device for forecasting energy demand using machine learning, the device comprising:
a memory; and
one or more processors communicatively coupled to the memory, the one or more processors configured to:
determine a forecasted occupancy corresponding to one or more facilities of an organization based at least in part on sensor data received from one or more sensors located at the one or more facilities;
provide first input data to a first set of one or more machine learning (ML) models to generate a forecasted energy demand corresponding to the one or more facilities,
wherein the first input data is based on the forecasted occupancy and historical energy demand data corresponding to the one or more facilities, and
wherein the first set of ML models is configured to forecast energy demand based on energy data and occupancy data;
provide second input data to a second set of one or more ML models to select energy resources to be used at the one or more facilities to satisfy the forecasted energy demand,
wherein the second input data is based on the forecasted energy demand and available energy resources information, and
wherein the second set of ML models is configured to select energy sources based on energy demand forecasts and energy source information;
determine an environmental impact as a result of use of the selected energy resources, wherein the environmental impact includes total carbon emissions, total other emissions, total water pollution, physical landscape changes, or a combination thereof as a result of using the selected energy resources;
select one or more recommended actions to offset the environmental impact;
output an energy plan that is based on the selected energy resources, wherein the energy plan indicates the one or more recommended actions to offset the environmental impact; and
initiate one or more actions to acquire the selected energy resources.

10. The device of claim 9, wherein the selected energy resources comprise at least one renewable energy resource.

11. The device of claim 9, wherein the one or more sensors comprise identification scanners, cameras, temperature sensors, pressure sensors, or a combination thereof.

12. The device of claim 9, wherein:
the selected energy resources include at least one backup energy resource, and
the second set of ML models is configured to select energy resources based further on predicted outages at the one or more facilities.

13. The device of claim 9, wherein:
the energy resources information indicates available quantities of energy resources, costs associated with energy resources, government incentives associated with particular energy resources, the environmental impact associated with energy resources, one or more energy resource thresholds, or a combination thereof, and
the second set of ML models is configured to select energy resources based further on the available quantities, the costs, the government incentives, the environmental impact, the one or more energy resource thresholds, or a combination thereof.

14. A non-transitory computer-readable storage medium storing instructions that, when executed by one or more processors, cause the one or more processors to perform operations for forecasting energy demand using machine learning, the operations comprising:
determining a forecasted occupancy corresponding to one or more facilities of an organization based at least in part on sensor data received from one or more sensors located at the one or more facilities;
providing first input data to a first set of one or more machine learning (ML) models to generate a forecasted energy demand corresponding to the one or more facilities,
wherein the first input data is based on the forecasted occupancy and historical energy demand data corresponding to the one or more facilities, and
wherein the first set of ML models is configured to forecast energy demand based on energy data and occupancy data;
providing second input data to a second set of one or more ML models to select energy resources to be used at the one or more facilities to satisfy the forecasted energy demand,
wherein the second input data is based on the forecasted energy demand and available energy resources information, and
wherein the second set of ML models is configured to select energy sources based on energy demand forecasts and energy source information;
determining an environmental impact as a result of use of the selected energy resources, wherein the environmental impact includes total carbon emissions, total other emissions, total water pollution, physical landscape changes, or a combination thereof as a result of using the selected energy resources;
selecting one or more recommended actions to offset the environmental impact;
outputting an energy plan that is based on the selected energy resources, wherein the energy plan indicates the one or more recommended actions selected to offset the environmental impact; and
initiating one or more actions to acquire the selected energy resources.

15. The non-transitory computer-readable storage medium of claim 14, wherein the second set of ML models is configured to optimize a total cost associated with the selected energy resources, a total renewable energy use, the environmental impact offset, or a combination thereof.

16. The non-transitory computer-readable storage medium of claim 14, wherein the energy plan indicates the selected energy resources for each facility of the one or more facilities, for each geographic region of one or more geographic regions in which the organization operates, or for each operational group of the organization.

17. The non-transitory computer-readable storage medium of claim 14, wherein the operations further comprise:
training a plurality of ML models to select energy resources based on energy demand forecasts and energy resource information;
performing a grid search to select one or more hyperparameter values corresponding to the plurality of ML models; and
selecting the second set of ML models from the plurality of ML models based on the grid search.

18. The non-transitory computer-readable storage medium of claim 14, wherein the operations further comprise generating additional sensor data, additional historical energy demand data, or both, using gradient descent based on the sensor data or the historical energy demand data.

* * * * *